US012448476B2

United States Patent
Li et al.

(10) Patent No.: US 12,448,476 B2
(45) Date of Patent: Oct. 21, 2025

(54) MULTI(METH)ACRYLATE-FUNCTIONALIZED OLIGOMERS AND METHODS OF PREPARING AND USING SUCH OLIGOMERS

(71) Applicant: Arkema France, Colombes (FR)

(72) Inventors: Ling Li, Exton, PA (US); Yuhong He, Exton, PA (US)

(73) Assignee: Arkema France, Puteaux (FR)

( * ) Notice: Subject to any disclaimer, the term of this patent is extended or adjusted under 35 U.S.C. 154(b) by 0 days.

(21) Appl. No.: 17/771,080

(22) PCT Filed: Oct. 19, 2020

(86) PCT No.: PCT/IB2020/000861
§ 371 (c)(1),
(2) Date: Apr. 22, 2022

(87) PCT Pub. No.: WO2021/079187
PCT Pub. Date: Apr. 29, 2021

(65) Prior Publication Data
US 2022/0396652 A1   Dec. 15, 2022

Related U.S. Application Data

(60) Provisional application No. 62/924,743, filed on Oct. 23, 2019.

(51) Int. Cl.
C08F 290/06 (2006.01)
C08F 2/50 (2006.01)

(52) U.S. Cl.
CPC ............ *C08F 290/067* (2013.01); *C08F 2/50* (2013.01)

(58) Field of Classification Search
None
See application file for complete search history.

(56) References Cited

U.S. PATENT DOCUMENTS

| 4,387,139 A * | 6/1983 | Herwig | C08G 18/6705 |
| | | | 524/113 |
| 4,399,239 A * | 8/1983 | Herwig | C08F 299/065 |
| | | | 430/315 |
| 4,734,480 A | 3/1988 | Kotera et al. | |
| 4,786,657 A | 11/1988 | Hammar et al. | |
| 5,177,120 A * | 1/1993 | Hare | C08G 18/672 |
| | | | 523/109 |
| 7,261,842 B2 * | 8/2007 | Henry | G03C 1/73 |
| | | | 524/95 |
| 9,752,056 B2 | 9/2017 | Berger et al. | |
| 2004/0198868 A1 * | 10/2004 | Tielemans | C09D 11/101 |
| | | | 523/161 |
| 2016/0053146 A1 | 2/2016 | Miyake et al. | |

FOREIGN PATENT DOCUMENTS

| EP | 0072918 A1 * | 3/1983 | ........... C08G 18/675 |
| EP | 0298611 A2 | 11/1989 | |
| JP | S62112665 A | 5/1987 | |
| JP | S63105070 A | 5/1988 | |
| WO | WO-2009051370 A2 * | 4/2009 | ........... C09D 133/24 |
| WO | WO12026475 A1 | 3/2012 | |

* cited by examiner

*Primary Examiner* — Sanza L. McClendon
(74) *Attorney, Agent, or Firm* — Christopher R. Lewis

(57) ABSTRACT

A multi(meth)acrylate-functionalized oligomer has a polyurethane backbone, a plurality of (meth)acrylate groups pendant to the polyurethane backbone, and one or more terminal (meth)acrylate groups. The oligomer contains a) at least one multi(meth)acrylate-functionalized segment having at least two pendant (meth)acrylate groups, b) urethane-containing segments, c) at least one end-cap segment having at least one (meth)acrylate group, and, optionally, d) a chain-extending segment (such as a non-polymeric aliphatic segment, polyether-containing segment, polyester-containing segment, polydiene-containing segment, polycarbonate-containing segment or polyorganosiloxane-containing segment). At least one multi(meth)acrylate-functionalized segment is located at a pendant position and at least one (meth)acrylate group is present at one or more terminal positions of the oligomer. The multi(meth)acrylate-functionalized oligomers are useful in compositions which can be cured, including by photocuring, to provide polymeric articles. The oligomer may be a reaction product of a diisocyanate, a diol or triol compound comprising, respectively, two or three (meth)acrylate groups, and an end-capping compound.

26 Claims, No Drawings

MULTI(METH)ACRYLATE-FUNCTIONALIZED OLIGOMERS AND METHODS OF PREPARING AND USING SUCH OLIGOMERS

CROSS-REFERENCE TO RELATED APPLICATIONS

This application is a U.S. national stage application under 35 U.S.C. § 371 of international application number PCT/IB2020/000861, filed Oct. 19, 2020, which claims priority to U.S. patent application No. 62/924,743, filed Oct. 23, 2019.

FIELD OF THE INVENTION

The invention relates to multi(meth)acrylate-functionalized oligomers, methods of preparing such oligomers, curable compositions based on the oligomers, methods of using the oligomers, and compositions and articles containing the oligomers in cured form.

BACKGROUND OF THE INVENTION

Many different types of (meth)acrylate-functionalized oligomers are known in the art, including (meth)acrylate-functionalized urethane oligomers which are characterized by having one or more (meth)acrylate functional groups substituted at terminal ends of an oligomeric polyurethane backbone. (Meth)acrylate-functionalized urethane oligomers may be synthesized by various methods, including, for instance, reacting a polymeric polyol such as a polyether polyol, polycarbonate polyol or polyester polyol with an excess of polyisocyanate to form an isocyanate-functionalized urethane prepolymer and then reacting the isocyanate-functionalized urethane prepolymer with a reagent, such as hydroxyethyl(meth)acrylate, which contains both an isocyanate-reactive functional group and a (meth)acrylate functional group. Such (meth)acrylate-functionalized urethane oligomers have been found to be useful components of compositions capable of being cured (polymerized) using UV irradiation or other methods to form cured compositions which function as coatings, adhesives, sealants, additive manufacturing resins, molding resins and the like.

Conventional end-functional ("telechelic") (meth)acrylated urethane oligomers are a versatile class of reactive substances, but suffer from certain limitations due to their molecular architecture. In particular, because the reactive (meth)acrylate functionality is located at the terminal ends of the oligomer, the level of (meth)acrylate functionality and resulting crosslink density when such oligomers are cured are inversely related to the backbone molecular weight of the oligomer. Higher molecular weight backbones inherently result in lower crosslink density cured materials and lower molecular weight backbones necessarily result in high crosslink density. It would be beneficial to decouple this relationship, making it possible to achieve certain combinations of cured properties that at present are difficult to obtain through the use of conventional telechelic oligomers, thereby rendering curable compositions more tunable. Additionally, it is known that localized functionality, such as the localized functionality generated by the use of telechelic oligomers, can create a non-homogenous crosslinked network. Such a "non-homogenous" network can have an adverse impact on cured material properties and may, for example, impart brittleness and/or high vapor permeability. The development of oligomers which favor the production of more homogenous crosslinking thus would be of significant interest.

SUMMARY OF THE INVENTION

The present invention provides oligomers which have multiple (meth)acrylate functional groups which are located both along the backbone as well as at terminal positions of the oligomer. In particular, such an oligomer has a polyurethane backbone, a plurality of (meth)acrylate functional groups pendant to the polyurethane backbone, and one or more terminal (meth)acrylate functional groups. The oligomer comprises a) at least one multi(meth)acrylate-functionalized segment having at least two pendant (meth)acrylate groups, b) urethane-containing segments, c) at least one end-cap segment having at least one (meth)acrylate group, and, optionally, d) at least one chain-extending segment (containing at most one (meth)acrylate functional group) such as a nonpolymeric aliphatic segment or a polymer-containing segment selected from the group consisting of polyether-containing segments, polyester-containing segments, polydiene-containing segments, polycarbonate-containing segments and polyorganosiloxane-containing segments. At least one multi(meth)acrylate-functionalized segment is located at a position along the polyurethane backbone of the oligomer (which is different from a terminal position of the oligomer) and at least one (meth)acrylate functional group is present at one or more terminal positions of the oligomer. Oligomers in accordance with the present invention allow the crosslink density and the resulting mechanical properties of a cured composition prepared using such oligomers to be flexibly tailored by decoupling the curable functionality level and location from the backbone molecular weight of the oligomer. The reactive oligomers of the present invention, which contain both pendant and telechelic (meth)acrylate functionality are capable of being cured to produce more homogenously crosslinked materials, thereby avoiding or ameliorating the abovementioned drawbacks sometimes encountered with the "clustered" crosslinking characteristic of conventional telechelic oligomers.

A multi(meth)acrylate-functionalized oligomer in accordance with aspects of the present invention may be a reaction product of reactants comprising a) at least one diisocyanate, b) at least one diol compound comprised of at least two (meth)acrylate functional groups or at least one triol compound comprised of at least three (meth)acrylate functional groups or a mixture thereof, c) at least one end-capping compound comprised of a single isocyanate-reactive hydroxyl group and at least one (meth)acrylate functional group, and, optionally, d) at least one chain-extending diol which has either no (meth)acrylate functional groups or at most one (meth)acrylate functional group and which may be a non-polymeric diol (such as a non-polymeric aliphatic diol) and/or polymeric diol, such as a polymeric diol selected from the group consisting of polyether polyols, polyester polyols, polydiene polyols, polycarbonate polyols and polyorganosiloxane polyols).

A method of making a multi(meth)acrylate-functionalized oligomer having a polyurethane backbone, a plurality of (meth)acrylate functional groups pendant to the polyurethane backbone and one or more terminal (meth)acrylate functional groups is also provided by the present invention. Such a method comprises reacting a) at least one diisocyanate, b) at least one diol compound comprised of at least two (meth)acrylate functional groups or at least one triol compound comprised of at least three (meth)acrylate functional groups or a mixture thereof, c) at least one end-capping compound comprised of a single isocyanate-reactive hydroxyl group and at least one (meth)acrylate functional group, and, optionally, d) at least one chain-extending diol (which has either no (meth)acrylate functional groups or at most one (meth)acrylate functional group and which may be a non-polymeric diol and/or polymeric diol, such as a polymeric diol selected from the group consisting of polyether polyols, polyester polyols, polydiene polyols, polycarbonate polyols and polyorganosiloxane polyols). These components may be reacted with each other all at once or using different sequential steps, as will be explained in more detail subsequently.

Curable compositions are also provided by the present invention, wherein such curable compositions are comprised of at least one multi(meth)acrylate-functionalized oligomer in accordance with the invention and at least one of a) a photoinitiator or b) a curable compound other than a multi (meth)acrylate-functionalized oligomer in accordance with the invention.

The multi(meth)acrylate-functionalized oligomers of the present invention and curable compositions containing such oligomers may be cured by various mechanisms, including photocuring, to provide cured compositions having useful properties such as improved tensile strength. The multi (meth)acrylate-functionalized oligomers may be formulated with other reactive components and other additives to obtain curable compositions that can be utilized as curable coatings, adhesives, sealants, additive manufacturing resins and the like.

DETAILED DESCRIPTION OF EMBODIMENTS OF THE INVENTION

Definitions

In the present application, the term "comprise(s) a/an" means "comprise(s) one or more".

Unless mentioned otherwise, the % by weight in a compound or a composition are expressed based on the weight of the compound, respectively of the composition.

The term "(meth)acrylate functional group" refers to either an acrylate functional group (—O—C(=O)—CH=CH$_2$) or a methacrylate functional group (—O—C(=O)—C(CH$_3$)=CH$_2$). When not followed by the phrase "functional group," the term "(meth)acrylate" refers to a chemical compound that contains at least one acrylate functional group per molecule or at least one methacrylate functional group per molecule. "(Meth)acrylate" can also refer to a chemical compound that has both at least one acrylate functional group and at least one methacrylate functional group. "Functionality" refers to the number of (meth)acrylate functional groups per molecule. It does not refer to any other functional groups besides (meth)acrylate functional groups unless explicitly stated. For example, a difunctional monomer is understood to mean a monomer with two (meth)acrylate functional groups per molecule. On the other hand, a trifunctional alcohol is understood to mean a compound with three hydroxy groups per molecule with no (meth)acrylate groups. Without further description, "monomer" and "oligomer" are understood to mean (meth) acrylate monomer and (meth)acrylate oligomer, respectively.

The term "urethane (meth)acrylate" refers to a compound comprising at least one urethane bond and at least one (meth)acrylate functional group. Such compounds may also be referred to as urethane (meth)acrylate oligomers. The term "urethane bond" means a —NH—C(=O)—O— or —O—C(=O)—NH— bond.

The term "polyester" means a compound or moiety having more than one ester bonds. The term «ester bond» means a —C(=O)—O— or —O—C(=O)— bond.

The term "polyether" means a compound or moiety having more than one ether bonds. The term «ether bond» means a —O— bond.

The term "polycarbonate" means a compound or moiety having more than one carbonate bonds. The term «carbonate bond» means a —O—C(=O)—O— bond.

The term "polydiene" means a compound or moiety obtained by polymerizing a conjugated diene.

The term "polyorganosiloxane" means a compound or moiety having more than one siloxane bonds. The term "siloxane bond" means a —Si—O— or —O—Si— bond.

The term "diol" means a compound bearing 2 hydroxy groups.

The term "triol" means a compound bearing 3 hydroxy groups.

The term «hydroxy group» means a —OH group.

The term "diisocyanate" means a compound bearing 2 isocyanate groups.

The term «isocyanate group» means a —N=C=O group.

The term "polyoxyethylene" means a compound or moiety having more than one oxyethylene units. The term "oxyethylene unit" means a —(O—CH$_2$—CH$_2$)— unit.

The term "polyoxypropylene" means a compound or moiety having more than one oxypropylene units. The term "oxypropylene unit" means a —(O—CH(CH$_3$)—CH$_2$)— and/or —(O—CH$_2$—CH(CH$_3$))— unit.

The term "polyoxytetramethylene" means a compound or moiety having more than one oxotetramethylene units. The term "oxotetramethylene unit" means a —(O—CH$_2$—CH$_2$—CH$_2$—CH$_2$)— unit.

The term "organo" "hydrocarbon" or "hydrocarbyl" means a monovalent or multivalent (divalent, trivalent, tetravalent, pentavalent, hexavalent) group comprising carbon and hydrogen atoms. It may be linear or branched; saturated or unsaturated; cyclic or alicyclic; aliphatic, aromatic or araliphatic. It may contain 1 to 200 carbon atoms. A C2-C12 hydrocarbyl means a hydrocarbyl having 2 to 12 carbon atoms. It may be optionally substituted. It may contain one or more heteroatoms selected from O, N, S, Si and mixtures thereof in addition to the carbon and hydrogen atoms.

The term «aliphatic» means an optionally substituted non-aromatic compound or moiety. It may be linear or branched, saturated or unsaturated. It may be acyclic or comprise one or more cycloaliphatic rings (i.e. non-aromatic rings). It may comprise one or more heteroatoms such as O, N, S and/or halogen.

The term «aromatic» means an optionally substituted compound or moiety comprising an aromatic ring, which means that respects Hückel's aromaticity rule, in particular a compound comprising a phenyl group. It may comprise one or more heteroatoms such as O, N, S and/or halogen.

The term «araliphatic» means an optionally substituted compound or moiety containing aliphatic and aromatic moieties. It may comprise one or more heteroatoms such as O, N, S and/or halogen.

The term "alkylene" means a divalent moiety obtained by removing two hydrogen groups from an alkane of formula $C_nH_{2n+2}$. It may be linear or branched. A "C2-C4 dialkylene" means a dialkylene having 2 to 4 carbon atoms.

Examples of suitable dialkylene are ethylene, propylene, isopropylene, butylene and isobutylene.

The term «optionally substituted» means a compound substituted by one or more groups selected from alkyl, cycloalkyl, aryl, heteroaryl, alkoxy, alkylaryl, haloalkyl, hydroxy, halogen, isocyanate, nitrile, amine, carboxylic acid, —C(=O)—R'—C(=O)—OR', —C(=O)NH—R', —NH—C(=O)R', —O—C(=O)—NH—R', —NH—C(=O)—O—R', —C(=O)—O—C(=O)—R$^1$ and —SO$_2$—NH—R', each R$^1$ being independently an optionally substituted group selected from alkyl, aryl and alkylaryl.

The term «alkyl» means a monovalent saturated alicyclic hydrocarbon group of formula —C$_n$H$_{2n+1}$. An alkyl may be linear or branched. A «C1-C6 alkyl» means an alkyl having 1 to 20 carbon atoms. Examples of alkyl groups include methyl, ethyl, propyl, isopropyl, butyl, isobutyl, tert-butyl, pentyl and hexyl.

The term «cycloalkyl» means a monovalent saturated alicyclic hydrocarbon moiety comprising a cycle. Examples of cycloalkyl groups include cyclopentyl, cyclohexyl and isobornyl.

The term «aryl» means an aromatic hydrocarbon group.

The term "phenylene" means a multivalent moiety obtained by removing two or more hydrogen groups from a substituted or unsubstituted benzene.

The term «heteroaryl» means an aromatic group comprising a heteroatom such as O, N, S and mixtures thereof.

The term «alkoxy» means a group of formula —O-Alkyl.

The term «alkylaryl» means an alkyl substituted by an aryl group. An example of an alkylaryl group is benzyl (—CH$_2$-Phenyl).

The term «haloalkyl» means an alkyl substituted by one or more halogen atoms.

The term «halogen» means an atom selected from Cl, Br and I.

The term "ethylenically unsaturated compound" means a compound that comprises a polymerizable carbon-carbon double bond. A polymerizable carbon-carbon double bond is a carbon-carbon double bond that can react with another carbon-carbon double bond in a polymerization reaction. A polymerizable carbon-carbon double bond is generally comprised in a group selected from acrylate (including cyanoacrylate), methacrylate, acrylamide, methacrylamide, styrene, maleate, fumarate, itaconate, allyl, propenyl, vinyl and combinations thereof, preferably selected from acrylate, methacrylate and vinyl, more preferably selected from acrylate and methacrylate. The carbon-carbon double bonds of a phenyl ring are not considered as polymerizable carbon-carbon double bonds.

As used herein, the term "alkoxylated" refers to compounds in which one or more epoxides such as ethylene oxide and/or propylene oxide have been reacted with active hydrogen-containing groups (e.g., hydroxy groups) of a base compound, such as a polyol, to form one or more oxyalkylene moieties. For example, from 1 to 25 moles of epoxide may be reacted per mole of base compound.

Multi(meth)acrylate-Functionalized Oligomer

A multi(meth)acrylate-functionalized oligomer in accordance with aspects of the present invention may be characterized as an oligomer which contains a polyurethane backbone, a plurality of (meth)acrylate functional groups pendant to the polyurethane backbone, and one or more terminal (meth)acrylate functional groups. Thus, the oligomer bears a plurality of (meth)acrylate functional groups both along its backbone and at terminal ends of the oligomer. As used herein, the term "(meth)acrylate" refers to both acrylate and methacrylate functional groups. According to certain embodiments, each of the (meth)acrylate functional groups within one oligomer molecule may be of the same type (i.e., all the (meth)acrylate functional groups in the oligomer may be acrylate functional groups or all of the (meth)acrylate functional groups in the oligomer may be methacrylate functional groups). The oligomer may contain both acrylate and methacrylate functional groups. For example, the terminal (meth)acrylate functional groups may be acrylate functional groups while the (meth)acrylate functional groups pendant to the polyurethane backbone may be methacrylate functional groups, or vice versa.

Oligomers in accordance with the invention contain at least three (meth)acrylate functional groups per molecule (at least two of which are associated with a multi(meth)acrylate-functionalized segment and at least one of which is associated with a terminal end of the oligomer). However, in embodiments of the invention the oligomers may contain a total of four, five, six, seven, eight, nine, ten or more (meth)acrylate functional groups per molecule. The number of (meth)acrylate functional groups per molecule may be readily controlled or varied as may be desired by, for example, changing the number average molecular weight of the oligomer, the number of multi(meth)acrylate-functionalized segments in the oligomer, and/or the types of reactants used to prepare the oligomer, as will be explained in more detail subsequently.

According to certain embodiments, the multi(meth)acrylate-functionalized oligomers are linear in structure (wherein (meth)acrylate functional groups associated with multi(meth)acrylate-functionalized segments are not considered to be branches). However, in other embodiments the oligomers may have a star, comb, radial or branched structure.

The multi(meth)acrylate-functionalized oligomers may be comprised of, may consist essentially of, or may consist of a) at least one multi(meth)acrylate-functionalized segment having at least two pendant (meth)acrylate groups, b) urethane-containing segments, c) at least one end-cap segment having at least one (meth)acrylate group, and, optionally, d) at least one chain-extending segment. The chain-extending segment(s) may be one or more of nonpolymeric segments and/or polymeric segments. Such optional chain-extending segments are differentiated from the multi(meth)acrylate-functionalized segment(s) in that they contain no more than one (meth)acrylate functional group per segment (i.e., either no (meth)acrylate functional groups or at most one (meth)acrylate functional group. They are also differentiated from urethane-containing segments in that they do not contain urethane linkages. If present, the polymeric segment(s) may, for example, be selected from the group consisting of polyether-containing segments, polyester-containing segments, polydiene-containing segments, polycarbonate-containing segments and polyorganosiloxane-containing segments. If present, the nonpolymeric segments may be aliphatic, aromatic or araliphatic (containing both aliphatic and aromatic moieties). Thus, in certain embodiments the oligomers contain one or more such chain-extending segments, but in other embodiments the oligomers do not contain any such chain-extending segments. A characteristic of the oligomers of the present invention is that at least one multi(meth)acrylate-functionalized segment is located at a position along the polyurethane backbone of the oligomer (namely, pendant to the polyurethane backbone, which is different from at a terminal position) and at least one (meth)acrylate functional group is present at one or more terminal positions of the oligomer.

The number average molecular weight of the multi(meth)acrylate-functionalized oligomer may be varied as may be desired in order to impart certain characteristics to the oligomer itself and to cured compositions prepared from the oligomers. Generally speaking, if the oligomer comprises at least one polymer-containing segment the number average molecular weight typically is somewhat higher. For example, the oligomer may comprise one or more polymer-containing segments (i.e., chain-extending segments which are polymeric segments) and have a number average molecular weight of from 3000 g/mol to 20,000 g/mol. Oligomers which do not comprise one or more polymer-containing segments may have a number average molecular weight of from 500 g/mol to 5000 g/mol, for example. As used herein, number average and weight average molecular weight values were obtained using an Agilent 1260 GPC with a refractive index detector and using polystyrene standards for calibration.

According to certain aspects of the invention, chain-extending segments (e.g., nonpolymeric segments and/or polymeric segments) and multi(meth)acrylate-functionalized segments may be present in the oligomer in a molar ratio of 0:1 to 10:1 (e.g., 0.1:1 to 10:1).

In embodiments where one or more chain-extending segments are present, the chain-extending segments and multi(meth)acrylate-functionalized segments may be randomly disposed along the polyurethane backbone and linked together by urethane-containing segments. By varying the synthetic method used to prepare the oligomer, it is also possible for the oligomer to have a more ordered structure. For example, the chain-extending segment(s) may be clustered near the center of the polyurethane backbone, with the multi(meth)acrylate-functionalized segments being positioned towards each end of the polyurethane backbone, or vice versa.

The urethane-containing segments are segments which contain urethane functional groups (i.e., —O—C(=O)—NH—) and generally function to link together multi(meth)acrylate-functionalized segments and/or chain-extending segments (should such chain-extending segments be present in the oligomer). For example, a urethane-containing segment may link two multi(meth)acrylate-functionalized segments together, or may link two chain-extending segments together, or may link a multi(meth)acrylate-functionalized segment with a chain-extending segment. A urethane-containing segment could also be present at one or more terminal ends of the oligomer and provide a way to link a terminal (meth)acrylate functional group with the polyurethane backbone of the oligomer.

Urethane-containing segments may be positioned between and link together multi(meth)acrylate-functionalized segments. As used herein "segment L may be positioned between and link together segments M" means that both sides of segment L are directly connected to a segment M to form a sequence -M-L-M-. Urethane-containing segments may be positioned between and link together multi(meth)acrylate-functionalized segments and chain-extending segments. As used herein "segment L may be positioned between and link together segments M and segments N" means that one side of segment L is directly connected to a segment M and the other side of segment L is directly connected to a segment N to form a sequence -M-L-N—. Urethane-containing segments may be positioned between and link together end-cap segments and multi(meth)acrylate-functionalized segments and/or, if one or more chain-extending segments are present, end-cap segments and chain-extending segments. Chain-extending segments and multi(meth)acrylate-functionalized segments may be randomly disposed along the polyurethane backbone and linked together by urethane-containing segments.

Representative and non-limiting examples of multi(meth)acrylate-functionalized oligomers in accordance with the present invention may be schematically depicted as follows:

ECS-UCS-MMFS-UCS-MMFS-UCS-MMFS-UCS-ECS
ECS-UCS-MMFS-UCS-CES-UCS-CES-UCS-MMFS-UCS-ECS
ECS-UCS-CES-UCS-MMFS-UCS-CES-UCS-MMFS-UCS-MMFS-UCS-ECS
ECS-UCS-MMFS-UCS-CES-UCS-ECS wherein MMFS=a multi(meth)acrylate-functionalized segment, UCS=a urethane-containing segment, ECS=an end-cap segment, and CES=a chain-extending segment.

Typically, because of the ways they are generally synthesized, oligomers in accordance with the present invention will be obtained as mixtures of oligomers having a range of different molecular weights, varying numbers of multi(meth)acrylate-functionalized segments, urethane-containing segments, end-cap segments, and, optionally, chain-extending segments, and different sequences of such segments.

In certain aspects of the invention, the urethane-containing segments may correspond to Formula (I):

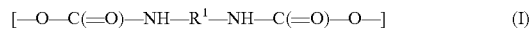

[—O—C(=O)—NH—R$^1$—NH—C(=O)—O—]    (I)

wherein R$^1$ is a divalent organo (e.g., hydrocarbyl) moiety. The hydrocarbyl moiety may be an aliphatic moiety (which may be linear, branched or cyclic), an aromatic moiety, or an araliphatic moiety (containing both aliphatic and aromatic components). It is also possible for the organo moiety to contain one or more heteroatoms (e.g., O, N, halogen) in addition to carbon and hydrogen atoms.

The urethane-containing segment may comprise, for example, a residue of a diisocyanate selected from the group consisting of tolylene diisocyanate, 4,4-diphenylmethane diisocyanate, xylylene diisocyanate, tetramethylxylylene diisocyanate, xylene diisocyanate, hexamethylene diisocyanate, lysine diisocyanate, 4,4'-methylenebis(cyclohexyl isocyanate), methylcyclohexane-2,4-diisocyanate, methylcyclohexane-2,6-diisocyanate, 1,3-(isocyanate methyl) cyclohexane, isophorone diisocyanate, trimethylhexamethylene diisocyanate, dimer acid diisocyanate, dianisidine diisocyanate, phenyl diisocyanate, halogenated phenyl diisocyanate, methylene diisocyanate, ethylene diisocyanate, butylene diisocyanate, propylene diisocyanate, octadecylene diisocyanate, 1,5-naphthalene diisocyanate, polymethylene polyphenylene diisocyanate, tolylene diisocyanate polymer (polymeric tolylene diisocyanate), diphenylmethane diisocyanate polymer (polymeric diphenylmethane diisocyanate, PMDI), hexamethylene diisocyanate polymer (polymeric hexamethylene diisocyanate), 3-phenyl-2-ethylene diisocyanate, cumene-2,4-diisocyanate, 4-methoxy-1,3-phenylene diisocyanate, 4-ethoxy-1,3-phenylene diisocyanate, 2,4'-diisocyanate diphenyl ether, 5,6-dimethyl-1,3-phenylene diisocyanate, 4,4'-diisocyanate diphenyl ether, benzidine diisocyanate, 9,10-anthracene diisocyanate, 4,4'-diisocyanate benzyl, 3,3'-dimethyl-4,4'-diisocyanate diphenylmethane, 2,6'-dimethyl-4,4'-diisocyanate diphenyl, 3,3'-dimethoxy-4,4'-diisocyanate diphenyl, 1,4-anthracene diisocyanate, phenylene diisocyanate, 1,4-tetramethylene diisocyanate, 1,6-hexamethylene diisocyanate, 1,10-decamethylene diisocyanate, 1,3-cyclohexylene diisocyanate, 4,4'-methylene-bis(cyclohexyl isocyanate), and combinations thereof. It is also possible for R$^1$ to be the residue of a higher functionality polyisocyanate, such as a triisocyanate (e.g., triphenylmethane triisocyanate, 2,4,6-tolylene triisocyanate, 2,4,4'-triisocyanate diphenyl ether), although care should be taken when using such higher functionality polyisocyanates to avoid problems with gelling of the oligomer.

According to certain aspects of the invention, the oligomer may comprise one or more multi(meth)acrylate-functionalized segments corresponding to Formula (IIa):

$$[-CHR^2-R^3-CHR^4-] \qquad (IIa)$$

wherein $R^2$ and $R^4$ are the same or different and correspond to $-CH_2-O-C(=O)-CR^5=CH_2$, wherein $R^5$ is H or $CH_3$, and $R^3$ is a divalent organo moiety. For example, $R^3$ may be $-R^{3'}-$ or $-CH_2-O-R^{3'}-O-CH_2-$ wherein $R^{3'}$ is a divalent hydrocarbon moiety. Suitable divalent hydrocarbon moieties include aliphatic divalent hydrocarbon moieties (which may be linear, branched or cyclic in structure), aromatic divalent hydrocarbon moieties, and araliphatic divalent hydrocarbon moieties. $R^3$ and $R^{3'}$ may also contain one or more heteroatoms (e.g., N, O, S, halogen) in addition to carbon and hydrogen atoms. Exemplary divalent hydrocarbon moieties include, but are not limited to, one of the following moieties

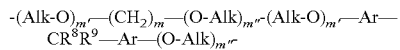

wherein m is an integer of at least 2 (e.g., 2-10),
m' and m" are independently integers from 0 to 20,
each Alk is independently a C2-C4 alkylene, typically ethylene or 1,2-propylene or 1,4-butylene;
each Ar is the same or different and is a substituted or unsubstituted aromatic moiety (such as a substituted or unsubstituted phenylene moiety); and
$R^8$ and $R^9$ are the same or different and are selected from the group consisting of H, aryl and alkyl.

According to certain aspects of the invention, the oligomer may comprise one or more multi(meth)acrylate-functionalized segments corresponding to Formula (IIb):

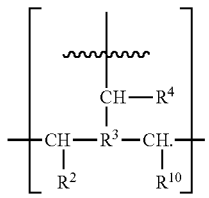
(IIb)

wherein $R^2$ and $R^4$ and $R^{10}$ are the same or different and correspond to $-CH_2-O-C(=O)-CR^5=CH_2$, wherein $R^5$ is H or $CH_3$; $R^3$ is a trivalent organo moiety; and the wavy line represents a point of attachment to another segment of the oligomer, in particular to a urethane-containing segment. For example, $R^3$ may be $-R^{3'}-$ or

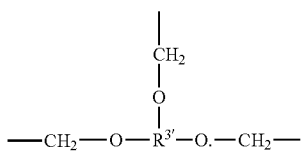

wherein $R^{3'}$ is a trivalent hydrocarbon moiety. Suitable trivalent hydrocarbon moieties include aliphatic trivalent hydrocarbon moieties (which may be linear, branched or cyclic in structure), aromatic trivalent hydrocarbon moieties, and araliphatic trivalent hydrocarbon moieties. $R^3$ and $R^{3'}$ may also contain one or more heteroatoms (e.g., N, O, S, halogen) in addition to carbon and hydrogen atoms. Exemplary trivalent hydrocarbon moieties include, but are not limited to, one of the following moieties

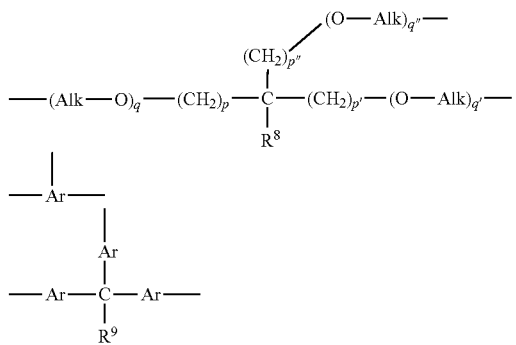

wherein p, p' and p" are independently integers from 0 to 10;
q, q' and q" are independently integers from 0 to 20;
each Alk is independently a C2-C4 alkylene, typically ethylene or 1,2-propylene or 1,4-butylene;
each Ar is the same or different and is a substituted or unsubstituted aromatic moiety (such as a substituted or unsubstituted phenylene moiety);
$R^8$ and $R^9$ are the same or different and are selected from the group consisting of H and alkyl.

As previously mentioned, the oligomer may optionally comprise at least one polymeric segment as a chain-extending segment. The polymeric segment(s) may be selected from the group consisting of polyether-containing segments, polyester-containing segments, polydiene-containing segments, polycarbonate-containing segments and polyorganosiloxane-containing segments. Although different types of polymeric segments may be present in the oligomer, according to certain embodiments the oligomer comprises only one type of polymeric segment.

The polymeric segment may correspond to Formula (III):

$$[-R^6-] \qquad (III)$$

wherein $R^6$ is a divalent polymeric moiety, such as a divalent polyether moiety, a divalent polyester moiety, a divalent polydiene moiety, a divalent polycarbonate moiety, or a divalent polyorganosiloxane moiety. According to certain aspects of the invention, the divalent polymeric moiety may have a number average molecular weight of from 200 g/mol to 6000 g/mol.

Suitable divalent polyether moieties include aliphatic divalent polyether moieties such as divalent polyoxyethylene moieties, divalent polyoxypropylene moieties, divalent polyoxyethylene/oxypropylene moieties, and divalent polyoxytetramethylene moieties.

The polymeric segment may be a residue of a dihydroxyfunctionalized polymer, such as a polyether diol, a polyester diol, a polydiene diol, a polycarbonate diol, or a polyorganosiloxane diol. Typically, the hydroxyl groups in such polymers are in terminal positions and are primary or secondary hydroxyl groups, which will react readily with the diisocyanates used to make the oligomers.

As previously mentioned, the oligomer may optionally comprise at least one nonpolymeric segment as a chain-extending segment. As used herein, the term "nonpolymeric" refers to a substance containing up to four repeating monomeric units (segment derived from ethylene glycol, which has a single oxyethylene unit, and triethylene glycol, which has three repeating oxyethylene units, would both be considered nonpolymeric, for example). Although different types of nonpolymeric segments may be present in the oligomer, according to certain embodiments the oligomer comprises only one type of nonpolymeric segment.

The nonpolymeric segment may correspond to Formula (IIIa):

$$[—R^{6a}—] \quad (IIIa)$$

wherein $R^{6a}$ is a divalent aliphatic, aromatic or araliphatic moiety, such as a divalent C2-C30 aliphatic moiety, which may be linear or branched or contain one or more cycloaliphatic rings. The divalent aliphatic, aromatic or araliphatic moiety may contain one or more heteroatoms such as O, N, S and/or halogen. Such nonpolymeric segments are differentiated from the multi(meth)acrylate-functionalized segments in that they contain, at most, a single (meth)acrylate functional group. They are differentiated from the end cap segments in that they are divalent, rather than monovalent. Additionally, the nonpolymeric segments differ from the urethane-containing segments in that they do not contain urethane groups which function as linkages between segments in the oligomer.

The nonpolymeric segment may be a nonpolymeric aliphatic segment which is a residue of an aliphatic diol (linear, branched or containing a ring structure) such as ethylene glycol, 1,2-propanediol, 1,3-propanediol, 1,4-butanediol, neopentyl glycol, 2-ethyl-1,3-hexanediol, 1,3-butanediol, 2-butyl-2-ethyl-1,3-propanediol, 2,4-diethyl-1,5-pentanediol and the like and short chain oligomers thereof (containing up to four oxyalkylene repeating units). Typically, the hydroxyl groups in such aliphatic diols are primary or secondary hydroxyl groups, which will react readily with the diisocyanates used to make the oligomers.

The at least one end-cap segment which is present in the oligomer may have a structure corresponding to Formula (IV):

$$—O—R^7—[O—C(=O)—CR^8=CH_2]_n \quad (IV)$$

wherein $R^7$ is an n+1 valent organo moiety, $R^8$ is H or $CH_3$, and n is an integer of 1 to 5. Each terminus of the oligomer may have an end-cap segment which corresponds to Formula (IV). $R^7$ may be the residue of a polyol, such as a diol, triol or tetraol (e.g., ethylene glycol, propylene glycol, diethylene glycol, triethylene glycol, dipropylene glycol, tripropylene glycol, trimethylolpropane, triethylolpropane, pentaerythritol, di-pentaerythritol, di-trimethylolpropane). In certain embodiments of the invention, $R^7$ is $—CH_2CH_2—$ or $—(CH_2)_5—C(=O)—[O—(CH_2)_5—C(=O)]_x—O—CH_2—CH_2—$, wherein x is an integer of from 0 to 9, and n=1. When n=1, $R^7=CH_2CH_2$, and $R^8=H$, such end cap segment may be derived from hydroxyethylacrylate. When n=1, $R^7=—(CH_2)_5—C(=O)—[O—(CH_2)_5—C(=O)]_x—O—CH_2—CH_2—$, and $R^8=H$, such end cap segment may be derived from a caprolactone-modified hydroxyethylacrylate.

Oligomers in accordance with the present invention may be comprised of one or more units of Formula (A2):

$$[—O—C(=O)—NH—R^1—NH—C(=O)—O—CHR^2—R^3—CHR^4—] \quad (A2)$$

wherein $R^1$ is a divalent hydrocarbon moiety, $R^2$ and $R^4$ are the same or different and correspond to $—CH_2—O—C(=O)—CR^5=CH_2$, wherein $R^5$ is H or $CH_3$ and $R^3$ is a divalent organo moiety. Thus, a unit of Formula (A2) may be a urethane-containing segment as previously described coupled to a multi(meth)acrylate-functionalized segment as previously described.

In addition to one or more units of Formula (A2), the oligomer may be optionally additionally comprised of one or more units of Formula (B):

$$[—O—C(=O)—NH—R^1—NH—C(=O)—O—R^6—] \quad (B)$$

wherein $R^1$ is a divalent hydrocarbon moiety and $R^6$ is a divalent polymeric moiety selected from the group consisting of divalent polyether moieties, divalent polyester moieties, divalent polydiene moieties, divalent polycarbonate moieties and divalent polyorganosiloxane moieties. Thus, a unit of Formula (B) may be a urethane-containing segment as previously described coupled to a polymeric segment as previously described. Alternatively, $R^6$ could be a divalent nonpolymeric moiety, such as a $C_2$-$C_{12}$ divalent hydrocarbyl moiety (e.g., $—(CH_2)_m—$, where m is an integer of 2 to 12).

Oligomers in accordance with the present invention may be comprised of one or more units of Formula (A3):

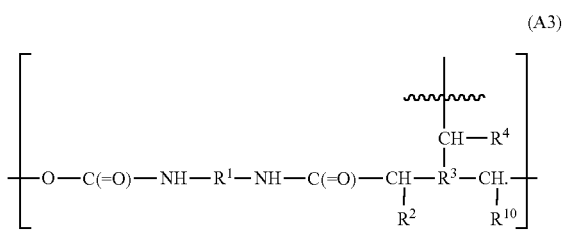

wherein $R^1$ is a divalent hydrocarbon moiety, $R^2$, $R^4$ and $R^{10}$ are the same or different and correspond to $—CH_2—O—C(=O)—CR^5=CH_2$, wherein $R^5$ is H or $CH_3$; $R^3$ is a trivalent organo moiety; and the wavy line represents a point of attachment to another segment of the oligomer, in particular to a urethane-containing segment. Thus, a unit of Formula (A3) may be a urethane-containing segment as previously described coupled to a multi(meth)acrylate-functionalized segment as previously described.

In addition to one or more units of Formula (A3), the oligomer may be optionally additionally comprised of one or more units of Formula (B) as described above.

The oligomer may be comprised of a mixture of one or more units of Formula (A2) and one or more units of Formula (A3) as described above, and optionally additionally comprised of one or more units of Formula (B) as described above.

Further aspects of the invention provide a multi(meth)acrylate-functionalized oligomer having a polyurethane backbone, a plurality of (meth)acrylate functional groups pendant to the polyurethane backbone and one or more terminal (meth)acrylate functional groups, wherein the oligomer is a reaction product of reactants comprising a) at least one diisocyanate, b) at least one diol compound comprised of at least two (meth)acrylate functional groups or at least one triol compound comprised of at least three (meth)acrylate functional groups or a mixture thereof, c) at least one end-capping compound comprised of a single isocyanate-reactive hydroxyl group and at least one (meth)acrylate functional group, and, optionally, d) at least one chain-extending diol (which contains no more than one (meth)acrylate functional group and which may be nonpolymeric or polymeric, such as a polymeric diol selected from the group consisting of polyether polyols, polyester polyols, polydiene polyols, polycarbonate polyols and polyorganosiloxane polyols).

To prepare (meth)acrylate-functionalized oligomers in accordance with the present invention, a diisocyanate or a mixture of different diisocyanates may be utilized. As used herein, the term "diisocyanate" means an organic compound containing two isocyanate (—NCO) functional groups per molecule. In certain embodiments, the diisocyanate is an aliphatic diisocyanate (including cycloaliphatic diisocyanates) or an aromatic diisocyanate.

According to certain embodiments of the invention, the diisocyanate may be represented by the following Formula (I'):

OCN—R'—NCO  (I')

wherein $R^1$ is a divalent organo moiety, such as a divalent hydrocarbon moiety. The divalent hydrocarbon moiety may be aliphatic (such as a linear, branched or cyclic aliphatic moiety), aromatic or araliphatic, for example. It is also possible for the divalent organo moiety to contain one or more heteroatoms, such as N, O or halogen, in addition to carbon and hydrogen atoms.

Illustrative examples of suitable diisocyanates include, without limitation, isophorone diisocyanate (IPDI), toluene diisocyanate (TDI), dicyclohexylmethane 4,4'-diisocyanate (also referred to as methylene dicyclohexyl diisocyanate or hydrogenated MDI (HMDI)), hexamethylene diisocyanate (1,6-hexane diisocyanate), 4,4'-methylenebis(phenylisocyanate), xylenediisocyanate, bitolylene diisocyanates (O-tolidine diisocyanates), 1,5-naphthylene diisocyanate, naphthalene diisocyanates, and dianisidine diisocyanates, and polymethylene polyphenylisocyanates. Examples of preferred diisocyanates include toluene diisocyanates (e.g., 2,4-toluene diisocyanate and 2,6-toluene diisocyanate), isophorone diisocyanate (IPDI), trimethylhexamethylene diisocyanates (e.g., 2,2,4-trimethylhexamethylene diisocyanate and 2,4,4-trimethylhexamethylene diisocyanate), xylylene diisocyanate (1,3-diisocyanatomethyl benzene), hydrogenated xylylene diisocyanate (sometimes referred to as 1,3-diisocyanatomethyl cyclohexane), methylene bis(4-isocyanato cyclohexane) (sometimes referred to as hydrogenated MDI or methylene-bis-cyclohexane diisocyanate) and combinations thereof.

The polyol compound used to prepare the multi(meth)acrylate-functionalized oligomer of the present invention is comprised of at least two (meth)acrylate functional groups in addition to at least two hydroxyl groups reactive with isocyanate. In certain embodiments, the polyol compound is a diol compound, i.e., a compound that contains only two hydroxyl groups reactive with isocyanate, in addition to at least two (meth)acrylate functional groups. According to certain aspects of the invention, the polyol compound is a diol compound corresponding to Formula (II'a):

HO—CHR²—R³—CHR⁴—OH  (II'a)

wherein $R^2$ and $R^4$ are the same or different and correspond to —CH$_2$—O—C(=O)—CR$^5$=CH$_2$,
wherein $R^5$ is H or CH$_3$, and $R^3$ is a divalent organo moiety. For example, $R^3$ may be —R³'— or —CH$_2$—O—R³'—O—CH$_2$— wherein R³' is a divalent hydrocarbon moiety. Suitable divalent hydrocarbon moieties include aliphatic divalent hydrocarbon moieties (which may be linear, branched or cyclic in structure), aromatic divalent hydrocarbon moieties, and araliphatic divalent hydrocarbon moieties. $R^3$ may also contain one or more heteroatoms (e.g., N, O, S, halogen) in addition to carbon and hydrogen atoms. Exemplary divalent hydrocarbon moieties include, but are not limited to, one of the following moieties:

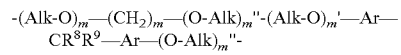
-(Alk-O)$_m$—(CH$_2$)$_m$—(O-Alk)$_{m''}$-(Alk-O)$_{m'}$—Ar—CR$^8$R$^9$—Ar—(O-Alk)$_{m'''}$- wherein m is an integer of at least 2 (e.g., 2-10);
m' and m'' are independently integers from 0 to 20,
each Alk is independently a C2-C4 alkylene, typically ethylene or 1,2-propylene or 1,4-butylene;
each Ar is the same or different and is a substituted or unsubstituted aromatic moiety (such as a substituted or unsubstituted phenylene moiety) and $R^8$ and $R^9$ are the same or different and are selected from the group consisting of H, aryl and alkyl.

According to certain embodiments of the invention, the polyol compound is or includes 1,4-bis(3-acryloyloxy-2-hydroxypropoxy)butane (where in Formula (II'a) $R^2$ and $R^4$ are each —CH$_2$—O—C(=O)—CH=CH$_2$ and $R^3$ is —CH$_2$—O—(CH$_2$)$_4$—O—CH$_2$—). This compound may be obtained by reacting 1,4-butane diol diglycidyl ether and acrylic acid.

According to certain aspects of the invention, the polyol compound is a triol compound corresponding to Formula (II'b):

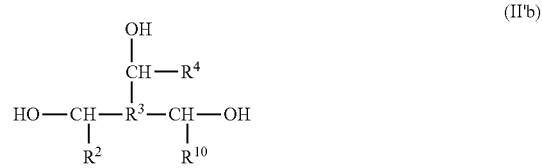

wherein $R^2$, $R^3$, $R^4$ and $R^{10}$ are as described above for formula (IIb).

According to certain embodiments of the invention, the polyol compound is or includes the triacrylate of trimethylolpropane triglycidyl ether (where in Formula (II'b) $R^2$, $R^4$ and $R^{10}$ are each —CH$_2$—O—C(=O)—CH=CH$_2$ and $R^3$ is

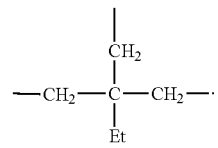

This compound may be obtained by reacting trimethylolpropane triglycidyl ether and acrylic acid.

The polyol compound may be, for example, a reaction product of reactants comprised of an acid-functionalized (meth)acrylate and a polyepoxide (e.g., a diepoxide or triepoxide). The acid-functionalized (meth)acrylate may have a structure corresponding to Formula (V):

H$_2$C=C(R)C(=O)O[CH$_2$CH$_2$C(=O)O]$_n$H  (V)

wherein R is H or CH$_3$ and n is an integer of 0 to 5. Compounds in accordance with Formula (V) include acrylic acid (R=H, n=0), methacrylic acid (R=CH$_3$, n=0), and oligomers thereof (where n=1, 2, 3, 4 or 5) and mixtures thereof.

Suitable acid-functionalized (meth)acrylates also include the so-called "half-esters" which are obtainable by reacting an anhydride or a dibasic acid with a hydroxy-functionalized acrylate or methacrylate.

Suitable anhydrides and dibasic acids for such purpose include aliphatic, aromatic and araliphatic anhydrides (containing an anhydride group) and dibasic acids (containing two carboxylic acid groups). Illustrative anhydrides and dibasic acids include, but are not limited to, phthalic anhydride, isophthalic acid, terephthalic acid, tetrabromophthalic anhydride, tetrahydrophthalic anhydride, hexahydrophthalic anhydride, itaconic anhydride, itaconic acid, phthalic acid, 5-norbornene-endo-2,3-dicarboxylic anhydride, naphthyl anhydride, maleic anhydride, succinic anhydride, chlorendic anhydride, maleic acid, succinic acid, fumaric acid, oxalic acid, malonic acid, glutaric acid, adipic acid, and dimer fatty acids.

Hydroxy-functionalized (meth)acrylates which may be reacted with the anhydride or dibasic acid to obtain an acid-functionalized (meth)acrylate may have structures corresponding to Formula (IV'):

$$HO-R^7-[O-C(=O)-CR^8=CH_2]_n \qquad (IV')$$

wherein $R^7$ is an n+1 valent organo moiety, $R^8$ is H or $CH_3$, and n is an integer of 1 to 3.

Hydroxyalkyl (meth)acrylates such as hydroxyethyl (meth)acrylate and hydroxypropyl(meth)acrylates are employed as the hydroxy-functional (meth)acrylate to be reacted with a diepoxide in certain embodiments of the invention. Examples of other suitable hydroxy-functional (meth)acrylates include, without limitation, trimethylolpropane di(meth)acrylate, pentaerythritol tri(meth)acrylate, triethylolpropane di(meth)acrylate, hydroxybutyl (meth)acrylates, glycerol di(meth)acrylate, neopentylglycol mono (meth)acrylate, hexanediol mono(meth)acrylates, octanediol mono(meth)acrylates, decanediol mono(meth)acrylates, tris(2-hydroxyethyl)isocyanurate di(meth)acrylate, diethyleneglycol mono(meth)acrylate, dipropyleneglycol mono (meth)acrylate, di(meth)acrylates of alkoxylated (e.g., ethoxylated and/or propoxylated) trimethylolpropane, di(meth)acrylates of alkoxylated triethylolpropane, di(meth)acrylates of alkoxylated glycerol, mono(meth)acrylates of alkoxylated hexanediol, mono(meth)acrylates of alkoxylated neopentyl glycol, caprolactone (meth)acrylates (sometimes also referred to as "caprolactone-modified (meth)acrylates") of structure $H_2C=CR-C(=O)-O-CH_2-CH_2-(O-C(=O)-CH_2-CH_2-CH_2-CH_2-CH_2)_x-OH$ (where R is H or $CH_3$ and x is an integer of 1 to 10), mono(meth)acrylates of bisphenols and alkoxylated bisphenols, mono(meth)acrylates of bis(hydroxymethyl)cyclohexane and alkoxylated bis(hydroxymethyl)cyclohexane, mono(meth)acrylates of tricyclodecanedimethanol and alkoxylated tricyclodecanedimethanol and the like and combinations thereof.

Suitable diepoxides or triepoxides which may be reacted with the acid-functionalized (meth)acrylate include, but are not limited to, diepoxides selected from the group consisting of diene diepoxides and diglycidyl ethers and triepoxides selected from triglycidyl ethers. A "diene diepoxide" is a compound corresponding to a diene in which both ene sites (i.e., both sites of ethylenically unsaturation) have been epoxidized). A "diglycidyl ether" is a compound containing two glycidyl ether functional groups (i.e., groups having the structure

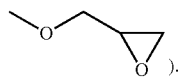).

The diepoxides may be aliphatic, aromatic or araliphatic. A "triglycidyl ether" is a compound containing three glycidyl ether functional groups (i.e., groups having the structure

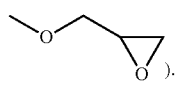).

The triepoxides may be aliphatic, aromatic or araliphatic.

Illustrative examples of suitable diepoxides include diglycidyl ethers of bisphenol compounds (e.g., diglycidyl ethers of bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, and bisphenol Z), diglycidyl ethers of hydrogenated bisphenol compounds, diglycidyl ethers of aliphatic glycols (e.g., diglycidyl ethers of ethylene glycol, propylene glycol or neopentyl glycol), 1,4-butanediol diglycidyl ether, 1,3-butadiene diepoxide, the diepoxides of vinyl cyclohexenes, the diepoxides of octadienes, dicyclopentadiene dioxide, diglycidyl 1,2-cyclohexanedicarboxylate, diepoxy cyclooctenes, 3,4-epoxycyclohexylmethyl 3,4-epoxycyclohexane carboxylate, diglycidyl ethers of dihydroxynaphthalenes, diglycidyl ether, 1,4-dihydroxybenzene diglycidyl ether, catechol diglycidyl ether and resorcinol diglycidyl ether and combinations thereof. Illustrative examples of suitable triepoxides include trimethylol propane triglycidyl ether, trimethylol ethane triglycidyl ether, castor oil glycidyl ether, glycerol triglycidyl ether, propoxylated glycol triglycidyl ether, poly glycerol-3-polyglycidyl ether, phloroglucinol triglycidyl ether, tris(4-hydroxyphenyl) methane triglycidyl ether, tris(4-hydroxyphenyl)ethane triglycidyl ether and combinations thereof.

The end-capping compound may be selected from the group consisting of (meth)acrylates of polyols in which all but one hydroxyl group has been (meth)acrylated. The polyol may be a diol, triol or tetraol, for example. Suitable end-capping compounds may generally correspond to the above-mentioned hydroxyl-functional (meth)acrylates and may have structures corresponding to Formula (IV'):

$$HO-R^7-[O-C(=O)-CR^8=CH_2]_n \qquad (IV')$$

wherein $R^7$ is an n+1 valent organo moiety, $R^8$ is H or $CH_3$, and n is an integer of 1 to 3.

Hydroxyalkyl (meth)acrylates such as hydroxyethyl (meth)acrylate and hydroxypropyl(meth)acrylates are employed as the end-capping compound in certain embodiments of the invention. Examples of other suitable end-capping compounds include, without limitation, trimethylolpropane di(meth)acrylate, pentaerythritol tri(meth)acrylate, triethylolpropane di(meth)acrylate, hydroxybutyl (meth)acrylates, glycerol di(meth)acrylate, neopentylglycol mono(meth)acrylate, hexanediol mono(meth)acrylates, octanediol mono(meth)acrylates, decanediol mono(meth)acrylates, tris(2-hydroxyethyl)isocyanurate di(meth)acrylate, diethyleneglycol mono(meth)acrylate, dipropyleneglycol mono(meth)acrylate, di(meth)acrylates of alkoxylated (e.g., ethoxylated and/or propoxylated) trimethylolpropane, di(meth)acrylates of alkoxylated triethylolpropane, di(meth)acrylates of alkoxylated glycerol, mono(meth)acrylates of alkoxylated hexanediol, mono(meth)acrylates of alkoxylated neopentyl glycol, caprolactone (meth)acrylates of structure $H_2C=CR-C(=O)-O-CH_2-CH_2-(O-C(=O)-CH_2-CH_2-CH_2-CH_2-CH_2)_x-OH$ (where R is H or $CH_3$ and x is an integer of 1 to 10), mono(meth) acrylates of bisphenols and alkoxylated bisphenols, mono (meth)acrylates of bis(hydroxymethyl)cyclohexane and alkoxylated bis(hydroxymethyl)cyclohexane, mono(meth) acrylates of tricyclodecanedimethanol and alkoxylated tricyclodecanedimethanol and the like and combinations thereof.

As previously mentioned, multi(meth)acrylate-functionalized oligomers may optionally be prepared using one or more polymeric diols and/or one or more nonpolymeric diols as a reactant. Such diols may be considered to be chain-extending diols, as they may function so as to increase the average spacing between the multi(meth)acrylate-functionalized segments along the polyurethane backbone of the oligomer and/or increase the number average molecular weight of the oligomer. As used herein, the term "polymeric diol" means a polymer bearing two isocyanate-reactive hydroxyl groups per molecule. As used herein, the term "nonpolymeric diol" means a nonpolymeric compound bearing two isocyanate-reactive hydroxyl groups per molecule. In the context of the present invention, the term "polymer" means a compound containing five or more repeating units per molecule and the term "nonpolymeric compound" means a compound containing up to four repeating units per molecule (and thus both monomeric compounds and oligomeric compounds containing 2 to 4 repeating units per molecule). For instance, ethylene glycol, diethylene glycol, triethylene glycol and tetraethylene glycol are all examples of nonpolymeric diols, whereas polyethylene glycol containing five or more oxyalkylene repeating units is an example of a polymeric diol.

Preferably, the hydroxyl groups are primary and/or secondary hydroxyl groups. In the case where the chain-extending diol is a polymeric polyol, the hydroxyl groups, according to certain embodiments, may be positioned at terminal ends of the polymer. However, it is also possible for hydroxyl groups to be present along the backbone of the polymer or on side chains or groups pendant to the polymer backbone. The polymer portion of the polymeric diol may be comprised of a plurality of repeating units such as oxyalkylene units, ester units, carbonate units, acrylic units, alkylene units or the like or combinations thereof.

According to certain embodiments of the invention, the polymeric diol may be represented by the following Formula (III'):

wherein $R^6$ is a polyether (e.g., polyoxyalkylene), polycarbonate, polydiene, polyorganosiloxane or polyester chain.

Particularly preferred polymeric diols include polyether diols and polyester diols. Suitable polyether diols include, for example, polytetramethylene glycols (hydroxyl-functionalized polymers of tetrahydrofuran) and polyethylene glycols (hydroxyl-functionalized polymers of ethylene oxide). Suitable polyester diols include, for example, poly (caprolactones), poly(lactides), poly(alkylene glycol adipates) and poly(alkylene glycol succinates).

Other types of polymeric polyols potentially useful in the present invention include polycarbonate polyols, polyorganosiloxane diols (e.g., polydimethylsiloxane diols), and polydiene diols (e.g., polybutadiene diols, including fully or partially hydrogenated polydiene polyols).

The molecular weight of the polymeric diol may be varied as may be needed or desired in order to achieve particular properties in the multi(meth)acrylate-functionalized oligomer prepared therefrom and/or in the curable composition containing the multi(meth)acrylate-functionalized oligomer and/or the cured composition obtained by curing the curable composition. For example, the number average molecular weight of the polymeric diol may be at least 300, at least 350, or at least 400 daltons. In other embodiments, the polymeric diol may have a number average molecular weight of 5000 daltons or less, 4500 daltons or less, or 4000 daltons or less. For example, the polymeric diol may have a number average molecular weight of 250 to 5000 daltons, 300 to 4500 daltons or 350 to 4000 daltons.

According to certain embodiments of the invention, the chain-extending diol may be represented by the following Formula (IIIa'):

wherein $R^{6a}$ is a divalent nonpolymeric aliphatic moiety optionally additionally comprising one or more heteroatoms (such as O, N, S and/or halogen).

In certain aspects of the invention, the chain-extending diol is or includes a nonpolymeric diol which is a hydrogenated dimer fatty acid (sometimes also referred to as a "dimer diol"), e.g., a diol obtained by dimerizing one or more unsaturated fatty acids such as oleic acid or linoleic acid and then hydrogenated to convert the carboxylic acid groups into hydroxyl groups. Pripol® 2033 (a product sold by Croda) is an example of a suitable commercially available hydrogenated dimer fatty acid.

Other types of suitable nonpolymeric diols include, but are not limited to, C2-C12 aliphatic diols and oligomers thereof (containing up to four oxyalkylene repeating units). The aliphatic diol may be linear, branched or cyclic in structure, with the hydroxyl groups being both primary or both secondary or one of each type (one primary hydroxyl group and one secondary hydroxyl group).

Examples of suitable C2-C12 aliphatic diols include, but are not limited to, ethylene glycol, 1,2-propylene glycol, 1,3-propanediol, 1,4-butanediol, 1,6-hexanediol, diethylene glycol, 2-methyl-1,3 propanediol, 3-methyl-1,5-pentanediol, 2,2-dimethyl-1,3-propanediol, 2,2,4-trimethyl 1,5-pentanediol, and 2-methyl-2-ethyl-1,3-propanediol, and oligomers thereof containing up to four oxyalkylene repeating units.

Illustrative Methods for Making Multi(meth)acrylate-Functionalized Oligomers

Various exemplary methods for preparing multi(meth) acrylate-functionalized oligomers in accordance with the present invention may be described as follows.

Method 1: A multi(meth)acrylate-functionalized oligomer in accordance with the invention may be synthesized by a process comprising combining and reacting at least one diisocyanate, at least one diol compound comprised of at least two (meth)acrylate functional groups or at least one triol compound comprised of at least three (meth)acrylate functional groups or a mixture thereof, at least one end-capping compound comprised of a single isocyanate-reactive hydroxyl group and at least one (meth)acrylate functional group, and, optionally, at least one polymeric diol to yield the multi(meth)acrylate-functionalized oligomer.

Method 2: A multi(meth)acrylate-functionalized oligomer in accordance with the invention may be synthesized by a process comprising a) combining and reacting at least one diisocyanate, at least one diol compound comprised of at least two (meth)acrylate functional groups or at least one triol compound comprised of at least three (meth)acrylate functional groups or a mixture thereof, and, optionally, at least one polymeric diol to yield an isocyanate-terminated intermediate oligomer and b) combining and reacting at least one end-capping compound comprised of a single isocyanate-reactive hydroxyl group and at least one (meth)acrylate functional group and the isocyanate-terminated intermediate oligomer to yield the multi(meth)acrylate-functionalized oligomer. The NCO:OH stoichiometry of the reactants in step a) may be adjusted and/or the method and/or sequence of combining and reacting the reactants may be varied to favor the production in step a) of an isocyanate-terminated intermediate oligomer.

Method 3: A multi(meth)acrylate-functionalized oligomer in accordance with the invention may be synthesized by a process comprising a) combining and reacting at least one diisocyanate, at least one diol compound comprised of at least two (meth)acrylate functional groups or at least one triol compound comprised of at least three (meth)acrylate functional groups or a mixture thereof, and, optionally, at least one polymeric diol to yield a hydroxyl-terminated intermediate oligomer and b) combining and reacting the hydroxyl-terminated intermediate oligomer and at least one isocyanate-functionalized (meth)acrylate (or a combination of a diisocyanate and an end-capping compound such as a hydroxyl-functionalized (meth)acrylate, e.g., 2-hydroxyethyl acrylate) to yield the multi(meth)acrylate-functionalized oligomer. The NCO:OH stoichiometry of the reactants in step a) may be adjusted and/or the method and/or sequence of combining and reacting the reactants may be varied to favor the production in step a) of a hydroxyl-terminated intermediate oligomer. The isocyanate-functionalized (meth)acrylate may be provided by reacting a diisocyanate and an end-capping compound comprised of a single isocyanate-reactive hydroxyl group and at least one (meth)acrylate functional group as described herein.

Method 4: A multi(meth)acrylate-functionalized oligomer in accordance with the invention may be synthesized by a process comprising a) combining and reacting at least one diisocyanate and at least one diol compound comprised of at least two (meth)acrylate functional groups or at least one triol compound comprised of at least three (meth)acrylate functional groups or a mixture thereof to yield an isocyanate-terminated intermediate oligomer; b) combining and reacting the isocyanate-terminated intermediate oligomer with a chain-extending polyol comprising at least two hydroxyl groups and zero or one (meth)acrylate functional groups to yield a hydroxyl-terminated intermediate oligomer, and d) combining and reacting the hydroxyl-terminated intermediate oligomer and at least one isocyanate-functionalized (meth)acrylate (or a combination of a diisocyanate and an end-capping compound such as a hydroxyl-functionalized (meth)acrylate, e.g., 2-hydroxyethyl acrylate) to yield the multi(meth)acrylate-functionalized oligomer. The NCO:OH stoichiometry of the reactants in step a) may be adjusted and/or the method and/or sequence of combining and reacting the reactants may be varied to favor the production in step a) of an isocyanate-terminated intermediate oligomer. The NCO:OH stoichiometry of the reactants in step b) may be adjusted and/or the method and/or sequence of combining and reacting the reactants may be varied to favor the production in step b) of a hydroxyl-terminated intermediate oligomer. The isocyanate-functionalized (meth)acrylate may be provided by reacting a diisocyanate and an end-capping compound comprised of a single isocyanate-reactive hydroxyl group and at least one (meth)acrylate functional group as described herein.

The amounts of the various constituents may vary over a wide range depending on the application. The at least one diol compound comprised of at least two (meth)acrylate functional groups or at least one triol compound comprised of at least three (meth)acrylate functional groups either individually or collectively may preferably vary from 0.1 wt % (based on all reactants) to 35 wt %, more preferably 0.2 wt % to 25 wt %, and most preferably 1 wt % to 10 wt %. The overall NCO:OH stoichiometry may be adjusted so that the free hydroxyl number in the final product is from 0 to 20 mg KOH/gm sample. The free hydroxyl number is determined by hydroxyl titration (ASTM E1899-08).

To prevent undesired side reactions, antioxidants (stabilizers) such as butylated hydroxytoluene may be present while the components used to prepare the oligomers are being reacted and/or the reaction mixtures may be sparged with air while such reacting is taking place. Conditions effective to achieve reaction between isocyanate compounds and isocyanate-reactive compounds of the type described herein as being useful in the preparation of oligomers in accordance with the present invention are well known in the art and may be readily selected and adapted as may be needed to accomplish the desired result for purposes of this invention. For example, to accelerate the reaction, the reaction mixture may be heated and/or a urethane catalyst (as described below) may be introduced. Further, the stoichiometry between the different components used to prepare the oligomers may be adjusted in accordance with conventional practice in order to achieve a particular desired degree of polyurethane chain extension and/or end group functionalization.

Urethane Catalyst

According to certain embodiments of the invention, one or more urethane catalysts are employed in the preparation of the multi(meth)acrylate-functionalized oligomer from the reactants previously described herein. As used herein, a "urethane catalyst" means a substance which is capable of catalyzing the reaction between a hydroxyl group and an isocyanate group to form a urethane linkage. Thus, a urethane catalyst may accelerate the rate at which such reaction takes place at a given temperature and/or achieve a target degree of completion of such reaction at a temperature which is lower than the temperature at which the target degree of completion is achieved in the absence of any urethane catalyst.

Any of the tin-based urethane catalysts known in the art may be utilized. However, according to certain preferred embodiments, a non-tin urethane catalyst or a combination of non-tin urethane catalysts is used. In certain embodiments, the intermediate reaction mixture(s) and the resulting product (containing the multi(meth)acrylate-functionalized oligomer) are free or substantially free of any tin urethane catalyst. For example, the reaction mixture at each stage as well as the final reaction product and the curable composition may comprise less than 500 ppb tin, less than 400 ppb tin, less than 300 ppb tin, less than 200 ppb tin or less than 100 ppb tin.

Suitable non-tin urethane catalysts include, for example, one or more non-tin urethane catalysts selected from the group consisting of carboxylate complexes of bismuth (such as bismuth octoate); acetylacetonate complexes of zirconium; acetylacetonate complexes of hafnium; acetylacetonate complexes of titanium; beta-diketiminato complexes of zirconium; beta-diketiminato complexes of hafnium; beta-diketiminato complexes of titanium; amidinate complexes of zirconium; amidinate complexes of hafnium; amidinate complexes of titanium; carboxylate complexes of zinc;

tertiary amines; imidazoles; N-heterocyclic carbenes; tetraalkylammonium (pseudo)halides; phosphines; and combinations thereof.

Typically, a urethane catalyst is utilized in an amount which is from 0.0001 to 0.1 weight %, based on the total weight of the final (meth)acrylate-functionalized oligomer.

Curable Compositions Containing Multi(meth)acrylate-Functionalized Oligomers

Although the multi(meth)acrylate-functionalized oligomers of the present invention may be used by themselves as curable compositions (i.e., compositions capable of being cured to provide polymerized, cured materials), in other aspects of the invention one or more multi(meth)acrylate-functionalized oligomers in accordance with the invention may be formulated with one or more additives (i.e., substance other than the inventive multi(meth)acrylate-functionalized oligomers) to provide curable compositions. Such additives may include, for example, reactive diluents, oligomers (especially (meth)acylate-functionalized oligomers) other than multi(meth)acrylate-functionalized oligomers in accordance with the present invention), stabilizers, initiators (including photoinitiators), fillers, pigments and the like and combinations thereof. Any of the additives known or used in the curable (meth)acrylate resin art may also be employed in connection with the multi(meth)acrylate-functionalized oligomers of the present invention to formulate curable compositions useful for a wide variety of end use applications. Certain of such additives are discussed in more detail below.

Additional Reactive Components

Curable compositions may be formulated to include one or more additional components capable of reacting with the multi(meth)acrylate-functionalized oligomers which are in accordance with the present invention. That is, such additional components become covalently bonded into the polymeric matrix formed upon curing of the curable composition. Such additional reactive components typically contain one or more ethylenically unsaturated functional groups per molecule, in particular one or more (meth)acrylate functional groups per molecule. Other types of suitable ethylenically unsaturated functional groups include, for example, vinyl functional groups and allyl functional groups. The additional reactive components may be monomeric or oligomeric in character, as described below in more detail.

The relative amounts of multi(meth)acrylate-functionalized oligomer(s) in accordance with the present invention and additional reactive components (such as other (meth) acrylate-functionalized compounds) in the curable composition is not considered to be critical and may be varied widely, depending upon the particular components selected for use and the properties sought in the curable composition and the cured composition obtained therefrom. For example, the curable composition may be comprised of 0.5 to 99.5% by weight multi(meth)acrylate-functionalized oligomer in accordance with the present invention and 0.5 to 99.5% by weight additional reactive components, based on the total weight of multi(meth)acrylate-functionalized oligomer in accordance with the invention and additional reactive components.

Suitable (meth)acrylate-functionalized compounds include both (meth)acrylate-functionalized monomers and (meth)acrylate-functionalized oligomers.

According to certain embodiments of the invention, the curable composition comprises, in addition to at least one multi(meth)acrylate-functionalized oligomer in accordance with the invention, at least one (meth)acrylate-functionalized monomer containing two or more (meth)acrylate functional groups per molecule. Examples of useful (meth) acrylate-functionalized monomers containing two or more (meth)acrylate functional groups per molecule include acrylate and methacrylate esters of polyhydric alcohols (organic compounds containing two or more, e.g., 2 to 6, hydroxyl groups per molecule). Specific examples of suitable polyhydric alcohols include $C_{2-20}$ alkylene glycols (glycols having a $C_{2-10}$ alkylene group may be preferred, in which the carbon chain may be branched; e.g., ethylene glycol, trimethylene glycol, 1,2-propylene glycol, 1,2-butanediol, 1,3-butanediol, 2,3-butanediol, tetramethylene glycol (1,4-butanediol), 1,5-pentanediol, 1,6-hexanediol, 1,8-octanediol, 1,9-nonanediol, 1,12-dodecanediol, cyclohexane-1,4-dimethanol, bisphenols, and hydrogenated bisphenols, as well as alkoxylated (e.g., ethoxylated and/or propoxylated) derivatives thereof, wherein for example from 1 to 20 moles of an alkylene oxide such as ethylene oxide and/or propylene oxide has been reacted with 1 mole of glycol), diethylene glycol, glycerin, alkoxylated glycerin, triethylene glycol, dipropylene glycol, tripropylene glycol, trimethylolpropane, alkoxylated trimethylolpropane, ditrimethylolpropane, alkoxylated ditrimethylolpropane, pentaerythritol, alkoxylated pentaerythritol, dipentaerythritol, alkoxylated dipentaerythritol, cyclohexanediol, alkoxylated cyclohexanediol, cyclohexanedimethanol, alkoxylated cyclohexanedimethanol, norbornene dimethanol, alkoxylated norbornene dimethanol, norbornane dimethanol, alkoxylated norbornane dimethanol, polyols containing an aromatic ring, cyclohexane-1,4-dimethanol ethylene oxide adducts, bis-phenol ethylene oxide adducts, hydrogenated bisphenol ethylene oxide adducts, bisphenol propylene oxide adducts, hydrogenated bisphenol propylene oxide adducts, cyclohexane-1, 4-dimethanol propylene oxide adducts, sugar alcohols and alkoxylated sugar alcohols. Such polyhydric alcohols may be fully or partially esterified (with (meth)acrylic acid, (meth)acrylic anhydride, (meth)acryloyl chloride or the like), provided they contain at least two (meth)acrylate functional groups per molecule. As used herein, the term "alkoxylated" refers to compounds in which one or more epoxides such as ethylene oxide and/or propylene oxide have been reacted with active hydrogen-containing groups (e.g., hydroxyl groups) of a base compound, such as a polyhydric alcohol, to form one or more oxyalkylene moieties. For example, from 1 to 25 moles of epoxide may be reacted per mole of base compound. According to certain aspects of the invention, the (meth)acrylate-functionalized monomer(s) used may be relatively low in molecular weight (e.g., 100 to 1000 daltons).

Any of the (meth)acrylate-functionalized oligomers known in the art may also be used in curable compositions of the present invention, provided the curable composition contains at least one multi(meth)acrylate-functionalized oligomer that is in accordance with the invention. According to certain embodiments, such oligomers contain two or more (meth)acrylate functional groups per molecule. The number average molecular weight of such oligomers may vary widely, e.g., from about 500 to about 50,000.

Suitable (meth)acrylate-functionalized oligomers include, for example, polyester (meth)acrylate oligomers, epoxy (meth)acrylate oligomers, polyether (meth)acrylate oligomers, polyurethane (meth)acrylate oligomers, acrylic (meth) acrylate oligomers, polydiene (meth)acrylate oligomers, polycarbonate (meth)acrylate oligomers and combinations thereof. Such oligomers may be selected and used in combination with one or more (meth)acrylate-functionalized monomers in order to enhance the flexibility, strength and/or modulus, among other attributes, of a cured resin foam prepared using the multi-component system of the present invention.

Exemplary polyester (meth)acrylate oligomers include the reaction products of acrylic or methacrylic acid or mixtures thereof with hydroxyl group-terminated polyester polyols. The reaction process may be conducted such that all or essentially all of the hydroxyl groups of the polyester polyol have been (meth)acrylated, particularly in cases where the polyester polyol is difunctional. The polyester polyols can be made by polycondensation reactions of polyhydroxyl functional components (in particular, diols) and polycarboxylic acid functional compounds (in particular, dicarboxylic acids and anhydrides). The polyhydroxyl functional and polycarboxylic acid functional components can each have linear, branched, cycloaliphatic or aromatic structures and can be used individually or as mixtures.

Examples of suitable epoxy (meth)acrylate oligomers include the reaction products of acrylic or methacrylic acid or mixtures thereof with glycidyl ethers or esters.

Suitable polyether (meth)acrylate oligomers include, but are not limited to, the condensation reaction products of acrylic or methacrylic acid or mixtures thereof with polyetherols which are polyether polyols (such as polyethylene glycol, polypropylene glycol or polytetramethylene glycol). Suitable polyetherols can be linear or branched substances containing ether bonds and terminal hydroxyl groups. Polyetherols can be prepared by ring opening polymerization of cyclic ethers such as tetrahydrofuran or alkylene oxides with a starter molecule. Suitable starter molecules include water, polyhydroxyl functional materials, polyester polyols and amines.

Polyurethane (meth)acrylate oligomers (sometimes also referred to as "urethane (meth)acrylate oligomers") capable of being used in the multi-component systems of the present invention include urethanes based on aliphatic and/or aromatic polyester polyols and polyether polyols and aliphatic and/or aromatic polyester diisocyanates and polyether diisocyanates capped with (meth)acrylate end-groups. Suitable polyurethane (meth)acrylate oligomers include, for example, aliphatic polyester-based urethane di- and tetra-acrylate oligomers, aliphatic polyether-based urethane di- and tetra-acrylate oligomers, as well as aliphatic polyester/polyether-based urethane di- and tetra-acrylate oligomers.

In various embodiments, the polyurethane (meth)acrylate oligomers may be prepared by reacting aliphatic and/or aromatic diisocyanates with OH group terminated polyester polyols (including aromatic, aliphatic and mixed aliphatic/aromatic polyester polyols), polyether polyols, polycarbonate polyols, polycaprolactone polyols, polyorganosiloxane polyols (e.g., polydimethylsiloxane polyols), or polydiene polyols (e.g., polybutadiene polyols), or combinations thereof to form isocyanate-functionalized oligomers which are then reacted with hydroxyl-functionalized (meth)acrylates such as hydroxyethyl acrylate or hydroxyethyl methacrylate to provide terminal (meth)acrylate groups. For example, the polyurethane (meth)acrylate oligomers may contain two, three, four or more (meth)acrylate functional groups per molecule.

Suitable acrylic (meth)acrylate oligomers (sometimes also referred to in the art as "acrylic oligomers") include oligomers which may be described as substances having an oligomeric acrylic backbone which is functionalized with one or more (meth)acrylate groups (which may be at a terminus of the oligomer or pendant to the acrylic backbone). The acrylic backbone may be a homopolymer, random copolymer or block copolymer comprised of repeating units of acrylic monomers. The acrylic monomers may be any monomeric (meth)acrylate such as C1-C6 alkyl (meth)acrylates as well as functionalized (meth)acrylates such as (meth)acrylates bearing hydroxyl, carboxylic acid and/or epoxy groups. Acrylic (meth)acrylate oligomers may be prepared using any procedures known in the art, such as by oligomerizing monomers, at least a portion of which are functionalized with hydroxyl, carboxylic acid and/or epoxy groups (e.g., hydroxyalkyl(meth)acrylates, (meth)acrylic acid, glycidyl (meth)acrylate) to obtain a functionalized oligomer intermediate, which is then reacted with one or more (meth)acrylate-containing reactants to introduce the desired (meth)acrylate functional groups.

Exemplary (meth)acrylate-functionalized monomers and oligomers may include ethoxylated bisphenol A di(meth)acrylates; triethylene glycol di(meth)acrylate; ethylene glycol di(meth)acrylate; tetraethylene glycol di(meth)acrylate; polyethylene glycol di(meth)acrylates; 1,4-butanediol diacrylate; 1,4-butanediol dimethacrylate; diethylene glycol diacrylate; diethylene glycol dimethacrylate, 1,6-hexanediol diacrylate; 1,6-hexanediol dimethacrylate; neopentyl glycol diacrylate; neopentyl glycol di(meth)acrylate; polyethylene glycol (600) dimethacrylate (where 600 refers to the approximate number average molecular weight of the polyethylene glycol portion); polyethylene glycol (200) diacrylate; 1,12-dodecanediol dimethacrylate; tetraethylene glycol diacrylate; triethylene glycol diacrylate, 1,3-butylene glycol dimethacrylate, tripropylene glycol diacrylate, polybutadiene diacrylate; methyl pentanediol diacrylate; polyethylene glycol (400) diacrylate; ethoxylated$_2$ bisphenol A dimethacrylate; ethoxylated$_3$ bisphenol A dimethacrylate; ethoxylated$_3$ bisphenol A diacrylate; cyclohexane dimethanol dimethacrylate; cyclohexane dimethanol diacrylate; ethoxylated$_{10}$ bisphenol A dimethacrylate (where the numeral following "ethoxylated" is the average number of oxyalkylene moieties per molecule); dipropylene glycol diacrylate; ethoxylated$_4$ bisphenol A dimethacrylate; ethoxylated$_6$ bisphenol A dimethacrylate; ethoxylated$_8$ bisphenol A dimethacrylate; alkoxylated hexanediol diacrylates; alkoxylated cyclohexane dimethanol diacrylate; dodecane diacrylate; ethoxylated$_4$ bisphenol A diacrylate; ethoxylated$_{10}$ bisphenol A diacrylate; polyethylene glycol (400) dimethacrylate; polypropylene glycol (400) dimethacrylate; metallic diacrylates; modified metallic diacrylates; metallic dimethacrylates; polyethylene glycol (1000) dimethacrylate; methacrylated polybutadiene; propoxylated$_2$ neopentyl glycol diacrylate; ethoxylated$_{30}$ bisphenol A dimethacrylate; ethoxylated$_{30}$ bisphenol A diacrylate; alkoxylated neopentyl glycol diacrylates; polyethylene glycol dimethacrylates; 1,3-butylene glycol diacrylate; ethoxylated$_2$ bisphenol A dimethacrylate; dipropylene glycol diacrylate; ethoxylated$_4$ bisphenol A diacrylate; polyethylene glycol (600) diacrylate; polyethylene glycol (1000) dimethacrylate; tricyclodecane dimethanol diacrylate; propoxylated$_2$ neopentyl glycol diacrylate; diacrylates of alkoxylated aliphatic alcohols trimethylolpropane trimethacrylate; trimethylolpropane triacrylate; tris(2-hydroxyethyl) isocyanurate triacrylate; ethoxylated$_{20}$ trimethylolpropane triacrylate; pentaerythritol triacrylate; ethoxylated$_3$ trimethylolpropane triacrylate; propoxylated$_3$ trimethylolpropane triacrylate; ethoxylated$_6$ trimethylolpropane triacrylate; propoxylated$_6$ trimethylolpropane triacrylate; ethoxylated$_9$ trimethylolpropane triacrylate; alkoxylated trifunctional acrylate esters; trifunctional methacrylate esters; trifunctional acrylate esters; propoxylated$_3$ glyceryl triacrylate; propoxylated$_{5.5}$ glyceryl triacrylate; ethoxylated$_{15}$ trimethylolpropane triacrylate; trifunctional phosphoric acid esters; trifunctional acrylic acid esters; pentaerythritol tetraacrylate; di-trimethylolpropane tetraacrylate; ethoxylated$_4$ pentaerythritol tetraacrylate; pentaerythritol polyoxyethylene tetraacrylate; dipentaerythritol pentaacrylate; pentaacrylate esters; epoxy acrylate oligomers; epoxy methacrylate oligomers; urethane acrylate oligomers; urethane methacrylate oligomers; polyester acrylate oligomers; polyester methacrylate oligomers; stearyl methacrylate oligomer; acrylic acrylate oligomers; perfluorinated acrylate oligomers; perfluorinated methacrylate oligomers; amino acrylate oligomers; amine-modified polyether acrylate oligomers; and amino methacrylate oligomers.

The curable compositions of the present invention may optionally comprise one or more (meth)acrylate-functionalized compounds containing a single acrylate or methacrylate functional group per molecule (referred to herein as "mono (meth)acrylate-functionalized compounds"). Any of such compounds known in the art may be used.

Examples of suitable mono(meth)acrylate-functionalized compounds include, but are not limited to, mono-(meth) acrylate esters of aliphatic alcohols (wherein the aliphatic alcohol may be straight chain, branched or alicyclic and may be a mono-alcohol, a di-alcohol or a polyalcohol, provided only one hydroxyl group is esterified with (meth)acrylic acid); mono-(meth)acrylate esters of aromatic alcohols (such as phenols, including alkylated phenols); mono-(meth) acrylate esters of alkylaryl alcohols (such as benzyl alcohol); mono-(meth)acrylate esters of oligomeric and polymeric glycols such as diethylene glycol, triethylene glycol, dipropylene glycol, tripropylene glycol, polyethylene glycol, and polypropylene glycol); mono-(meth)acrylate esters of monoalkyl ethers of glycols, oligomeric glycols, polymeric glycols; mono-(meth)acrylate esters of alkoxylated (e.g., ethoxylated and/or propoxylated) aliphatic alcohols (wherein the aliphatic alcohol may be straight chain, branched or alicyclic and may be a mono-alcohol, a di-alcohol or a polyalcohol, provided only one hydroxyl group of the alkoxylated aliphatic alcohol is esterified with (meth) acrylic acid); mono-(meth)acrylate esters of alkoxylated (e.g., ethoxylated and/or propoxylated) aromatic alcohols (such as alkoxylated phenols); caprolactone mono(meth) acrylates; and the like.

The following compounds are specific examples of mono (meth)acrylate-functionalized compounds suitable for use in the curable compositions of the present invention: methyl (meth)acrylate; ethyl (meth)acrylate; n-propyl (meth)acrylate; n-butyl (meth)acrylate; isobutyl (meth)acrylate; n-hexyl (meth)acrylate; 2-ethylhexyl (meth)acrylate; n-octyl (meth)acrylate; isooctyl (meth)acrylate; n-decyl (meth)acrylate; n-dodecyl (meth)acrylate; tridecyl (meth)acrylate; tetradecyl (meth)acrylate; hexadecyl (meth)acrylate; 2-hydroxyethyl (meth)acrylate; 2- and 3-hydroxypropyl (meth) acrylate; 2-methoxyethyl (meth)acrylate; 2-ethoxyethyl (meth)acrylate; 2- and 3-ethoxypropyl (meth)acrylate; tetrahydrofurfuryl (meth)acrylate; alkoxylated tetrahydrofurfuryl (meth)acrylate; isobornyl (meth)acrylate; 2-(2-ethoxyethoxy)ethyl (meth)acrylate; cyclohexyl (meth)acrylate; glycidyl (meth)acrylate; isodecyl (meth)acrylate: 2-phenoxyethyl (meth)acrylate: lauryl (meth)acrylate; isobornyl (meth)acrylate; 2-phenoxyethyl (meth)acrylate; alkoxylated phenol (meth)acrylates; alkoxylated nonylphenol (meth) acrylates; cyclic trimethylolpropane formal (meth)acrylate; trimethylcyclohexanol (meth)acrylate; diethylene glycol monomethyl ether (meth)acrylate; diethylene glycol monoethyl ether (meth)acrylate; diethylene glycol monobutyl ether (meth)acrylate; triethylene glycol monoethyl ether (meth)acrylate; ethoxylated lauryl (meth)acrylate; methoxy polyethylene glycol (meth)acrylates; and combinations thereof.

Stabilizer

Generally speaking, it will be desirable to include one or more stabilizers in the curable compositions of the present invention in order to provide adequate storage stability and shelf life. Advantageously, one or more such stabilizers are present at each stage of the method used to prepare the curable composition, to protect against unwanted reactions of the components of the curable composition (in particular, the components of the curable composition bearing (meth) acrylate functional groups). As used herein, the term "stabilizer" means a compound or substance which retards or prevents reaction or curing of (meth)acrylate functional groups present in a composition in the absence of actinic radiation. However, it will be advantageous to select an amount and type of stabilizer such that the composition remains capable of being cured when exposed to actinic radiation (that is, the stabilizer does not prevent radiation curing of the composition). Typically, effective stabilizers for purposes of the present invention will be classified as free radical stabilizers (i.e., stabilizers which function by inhibiting free radical reactions).

Any of the stabilizers known in the art related to (meth) acrylate-functionalized compounds may be utilized in the present invention. Quinones represent a particularly preferred type of stabilizer which can be employed in the context of the present invention. As used herein, the term "quinone" includes both quinones and hydroquinones as well as ethers thereof such as monoalkyl, monoaryl, monoaralkyl and bis(hydroxyalkyl) ethers of hydroquinones. Hydroquinone monomethyl ether is an example of a suitable stabilizer which can be utilized.

The concentration of stabilizer in the curable composition will vary depending upon the particular stabilizer or combination of stabilizers selected for use and also on the degree of stabilization desired and the susceptibility of components in the curable compositions towards degradation in the absence of stabilizer. Typically, however, the curable composition is formulated to comprise from 50 to 5000 ppm stabilizer. According to certain embodiments of the invention, the reaction mixture during each stage of the method employed to make the curable composition contains at least some stabilizer, e.g., at least 50 ppm stabilizer.

Photoinitiator

In certain embodiments of the invention, the curable compositions described herein include at least one photoinitiator and are curable with radiant energy. A photoinitiator may be considered any type of substance that, upon exposure to radiation (e.g., actinic radiation), forms species that initiate the reaction and curing of polymerizing organic substances present in the curable composition. Suitable photoinitiators include both free radical photoinitiators as well as cationic photoinitiators and combinations thereof.

Free radical polymerization initiators are substances that form free radicals when irradiated. The use of free radical photoinitiators is especially preferred. Non-limiting types of free radical photoinitiators suitable for use in the curable compositions of the present invention include, for example, benzoins, benzoin ethers, acetophenones, benzyl, benzyl ketals, anthraquinones, phosphine oxides, α-hydroxyketones, phenylglyoxalates, α-aminoketones, benzophenones, thioxanthones, xanthones, acridine derivatives, phenazine derivatives, quinoxaline derivatives and triazine compounds.

The amount of photoinitiator may be varied as may be appropriate depending upon the photoinitiator(s) selected, the amounts and types of polymerizable species present in the curable composition, the radiation source and the radiation conditions used, among other factors. Typically, however, the amount of photoinitiator may be from 0.05% to 5%, preferably 0.1% to 2% by weight, based on the total weight of the curable composition.

Other Additives

The curable compositions of the present invention may optionally contain one or more additives instead of or in addition to the above-mentioned ingredients. Such additives include, but are not limited to, antioxidants/photostabilizers, light blockers/absorbers, polymerization inhibitors, foam inhibitors, flow or leveling agents, colorants, pigments, dispersants (wetting agents, surfactants), slip additives, fillers, chain transfer agents, thixotropic agents, matting agents, impact modifiers, waxes or other various additives, including any of the additives conventionally utilized in the coating, sealant, adhesive, molding, 3D printing or ink arts.

The curable compositions of the present invention may comprise one or more light blockers (sometimes referred to in the art as absorbers), particularly where the curable composition is to be used as a resin in a three-dimensional printing method involving photocuring of the curable composition. The light blocker(s) may be any such substances known in the three-dimensional printing art, including for example non-reactive pigments and dyes. The light blocker may be a visible light blocker or a UV light blocker, for example. Examples of suitable light blockers include, but are not limited to, titanium dioxide, carbon black and organic ultraviolet light absorbers such as hydroxybenzophenone, hydroxyphenylbenzotriazole, oxanilide, benzophenone, thioxanthone, hydroxyphenyltriazine, Sudan I, bromothymol blue, 2,2'-(2,5-thiophenediyl)bis(5-tert-butylbenzoxazole) (sold under the brand name "Benetex OB Plus") and benzotriazole ultraviolet light absorbers.

The amount of light blocker may be varied as may be desired or appropriate for particular applications. Generally speaking, if the curable composition contains light blocker, it is present in a concentration of from 0.001 to 10% by weight based on the weight of the curable composition.

Advantageously, the curable compositions of the present invention may be formulated to be solvent-free, i.e., free of any non-reactive volatile substances (substances having a boiling point at atmospheric pressure of 150° C. or less). For example, the curable compositions of the present invention may contain little or no non-reactive solvent, e.g., less than 10% or less than 5% or less than 1% or even 0% non-reactive solvent, based on the total weight of the curable composition.

Uses for Multi(meth)acrylate-Functionalized Oligomers and Curable Compositions Containing Multi(meth)acrylate-Functionalized Oligomers As previously mentioned, curable compositions prepared in accordance with the present invention may contain one or more photoinitiators and may be photocurable. In certain other embodiments of the invention, the curable compositions described herein do not include any initiator and are curable (at least in part) with electron beam energy. In other embodiments, the curable compositions described herein include at least one free radical initiator that decomposes when heated or in the presence of an accelerator and are curable chemically (i.e., without having to expose the curable composition to radiation). The at least one free radical initiator that decomposes when heated or in the presence of an accelerator may, for example, comprise a peroxide or azo compound. Suitable peroxides for this purpose may include any compound, in particular any organic compound, that contains at least one peroxy (—O—O—) moiety, such as, for example, dialkyl, diaryl and aryl/alkyl peroxides, hydroperoxides, percarbonates, peresters, peracids, acyl peroxides and the like. The at least one accelerator may comprise, for example, at least one tertiary amine and/or one or more other reducing agents based on metal-containing salts (such as, for example, carboxylate salts of transition metals such as iron, cobalt, manganese, vanadium and the like and combinations thereof). The accelerator(s) may be selected so as to promote the decomposition of the free radical initiator at room or ambient temperature to generate active free radical species, such that curing of the curable composition is achieved without having to heat or bake the curable composition. In other embodiments, no accelerator is present and the curable composition is heated to a temperature effective to cause decomposition of the free radical initiator and to generate free radical species which initiate curing of the polymerizable compound(s) present in the curable composition.

Advantageously, the curable compositions of the present invention may be formulated to be solvent-free, i.e., free of any non-reactive volatile substances (substances having a boiling point at atmospheric pressure of 150° C. or less). For example, the curable compositions of the present invention may contain little or no non-reactive solvent, e.g., less than 10% or less than 5% or less than 1% or even 0% non-reactive solvent, based on the total weight of the curable composition. If reactive diluents are utilized in the curable composition, they may be selected so as to render the curable composition sufficiently low in viscosity, even without solvent being present, that the curable composition can be easily applied at a suitable application temperature to a substrate surface so as to form a relatively thin, uniform layer.

In preferred embodiments of the invention, the curable composition is a liquid at 25° C. In various embodiments of the invention, the curable compositions described herein are formulated to have a viscosity of less than 10,000 mPa·s (cP), or less than 5000 mPa·s (cP), or less than 4000 mPa·s (cP), or less than 3000 mPa·s (cP), or less than 2500 mPa·s (cP), or less than 2000 mPa·s (cP), or less than 1500 mPa·s (cP), or less than 1000 mPa·s (cP) or even less than 500 mPa·s (cP) as measured at 25° C. using a Brookfield viscometer, model DV-II, using a 27 spindle (with the spindle speed varying typically between 20 and 200 rpm, depending on viscosity). In advantageous embodiments of the invention, the viscosity of the curable composition is from 200 to 5000 mPa·s (cP), or from 200 to 2000 mPa·s (cP), or from 200 to 1500 mPa·s (cP), or from 200 to 1000 mPa·s (cP) at 25° C. Relatively high viscosities can provide satisfactory performance in applications where the curable composition is heated above 25° C., such as in three-dimensional printing operations or the like which employ machines having heated resin vats.

The curable compositions described herein may be compositions that are to be subjected to curing by means of free radical polymerization, cationic polymerization or other types of polymerization. In particular embodiments, the curable compositions are photocured (i.e., cured by exposure to actinic radiation such as light, in particular visible or UV light). End use applications for the curable compositions include, but are not limited to, inks, coatings, adhesives, additive manufacturing resins (such as 3D printing resins), molding resins, sealants, composites, antistatic layers, electronic applications, recyclable materials, smart materials capable of detecting and responding to stimuli, and biomedical materials.

Cured compositions prepared from curable compositions as described herein may be used, for example, in three-dimensional articles (wherein the three-dimensional article may consist essentially of or consist of the cured composition), coated articles (wherein a substrate is coated with one or more layers of the cured composition, including encapsulated articles in which a substrate is completely encased by the cured composition), laminated or adhered articles (wherein a first component of the article is laminated or adhered to a second component by means of the cured composition), composite articles or printed articles (wherein graphics or the like are imprinted on a substrate, such as a paper, plastic or M-containing substrate, using the cured composition).

Curing of the curable compositions in accordance with the present invention may be carried out by any suitable method, such as free radical and/or cationic polymerization. One or more initiators, such as a free radical initiator (e.g., photoinitiator, peroxide initiator) may be present in the curable composition. Prior to curing, the curable composition may be applied to a substrate surface in any known conventional manner, for example, by spraying, knife coating, roller coating, casting, drum coating, dipping, and the like and combinations thereof. Indirect application using a transfer process may also be used. A substrate may be any commercially relevant substrate, such as a high surface energy substrate or a low surface energy substrate, such as a metal substrate or plastic substrate, respectively. The substrates may comprise metal, paper, cardboard, glass, thermoplastics such as polyolefins, polycarbonate, acrylonitrile butadiene styrene (ABS), and blends thereof, composites, wood, leather and combinations thereof. When used as an adhesive, the curable composition may be placed between two substrates and then cured, the cured composition thereby bonding the substrates together to provide an adhered article. Curable compositions in accordance with the present invention may also be formed or cured in a bulk manner (e.g., the curable composition may be cast into a suitable mold and then cured).

Curing may be accelerated or facilitated by supplying energy to the curable composition, such as by heating the curable composition and/or by exposing the curable composition to a radiation source, such as visible or UV light, infrared radiation, and/or electron beam radiation. Thus, the cured composition may be deemed the reaction product of the curable composition, formed by curing. A curable composition may be partially cured by exposure to actinic radiation, with further curing being achieved by heating the partially cured article. For example, an article formed from the curable composition (e.g., a 3D printed article) may be heated at a temperature of from 40° C. to 120° C. for a period of time of from 5 minutes to 12 hours.

A plurality of layers of a curable composition in accordance with the present invention may be applied to a substrate surface; the plurality of layers may be simultaneously cured (by exposure to a single dose of radiation, for example) or each layer may be successively cured before application of an additional layer of the curable composition.

The curable compositions which are described herein can be used as resins in three-dimensional printing applications. Three-dimensional (3D) printing (also referred to as additive manufacturing) is a process in which a 3D digital model is manufactured by the accretion of construction material. The 3D printed object is created by utilizing the computer-aided design (CAD) data of an object through sequential construction of two dimensional (2D) layers or slices that correspond to cross-sections of 3D objects. Stereolithography (SL) is one type of additive manufacturing where a liquid resin is hardened by selective exposure to a radiation to form each 2D layer. The radiation can be in the form of electromagnetic waves or an electron beam. The most commonly applied energy source is ultraviolet, visible or infrared radiation.

The inventive curable compositions described herein may be used as 3D printing resin formulations, that is, compositions intended for use in manufacturing three-dimensional articles using 3D printing techniques. Such three-dimensional articles may be free-standing/self-supporting and may consist essentially of or consist of a composition in accordance with the present invention that has been cured. The three-dimensional article may also be a composite, comprising at least one component consisting essentially of or consisting of a cured composition as previously mentioned as well as at least one additional component comprised of one or more materials other than such a cured composition (for example, a metal component or a thermoplastic component). The curable compositions of the present invention are particularly useful in digital light printing (DLP), although other types of three-dimensional (3D) printing methods may also be practiced using the inventive curable compositions (e.g., SLA, inkjet). The curable compositions of the present invention may be used in a three-dimensional printing operation together with another material which functions as a scaffold or support for the article formed from the curable composition of the present invention.

Thus, the curable compositions of the present invention are useful in the practice of various types of three-dimensional fabrication or printing techniques, including methods in which construction of a three-dimensional object is performed in a step-wise or layer-by-layer manner. In such methods, layer formation may be performed by solidification (curing) of the curable composition under the action of exposure to radiation, such as visible, UV or other actinic irradiation. For example, new layers may be formed at the top surface of the growing object or at the bottom surface of the growing object. The curable compositions of the present invention may also be advantageously employed in methods for the production of three-dimensional objects by additive manufacturing wherein the method is carried out continuously. For example, the object may be produced from a liquid interface. Suitable methods of this type are sometimes referred to in the art as "continuous liquid interface (or interphase) product (or printing)" ("CLIP") methods. Such methods are described, for example, in WO 2014/126830; WO 2014/126834; WO 2014/126837; and Tumbleston et al., "Continuous Liquid Interface Production of 3D Objects," Science Vol. 347, Issue 6228, pp. 1349-1352 (Mar. 20, 2015), the entire disclosure of which is incorporated herein by reference in its entirety for all purposes.

When stereolithography is conducted above an oxygen-permeable build window, the production of an article using a curable composition in accordance with the present invention may be enabled in a CLIP procedure by creating an oxygen-containing "dead zone" which is a thin uncured layer of the curable composition between the window and the surface of the cured article as it is being produced. In such a process, a curable composition is used in which curing (polymerization) is inhibited by the presence of molecular oxygen; such inhibition is typically observed, for example, in curable compositions which are capable of being cured by free radical mechanisms. The dead zone thickness which is desired may be maintained by selecting various control parameters such as photon flux and the optical and curing properties of the curable composition. The CLIP process proceeds by projecting a continuous sequence of actinic radiation (e.g., UV) images (which may be generated by a digital light-processing imaging unit, for example) through an oxygen-permeable, actinic radiation- (e.g., UV—) transparent window below a bath of the curable composition maintained in liquid form. A liquid interface below the advancing (growing) article is maintained by the dead zone created above the window. The curing article is continuously drawn out of the curable composition bath above the dead zone, which may be replenished by feeding into the bath additional quantities of the curable composition to compensate for the amounts of curable composition being cured and incorporated into the growing article.

Aspects of the Invention

Illustrative, non-limiting embodiments of the present invention may be summarized as follows:

Aspect 1: A multi(meth)acrylate-functionalized oligomer having a polyurethane backbone, a plurality of (meth)acrylate functional groups pendant to the polyurethane backbone, and one or more terminal (meth)acrylate functional groups, wherein the oligomer is comprised of a) at least one multi(meth)acrylate-functionalized segment having at least two pendant (meth)acrylate groups, b) urethane-containing segments, c) at least one end-cap segment having at least one (meth)acrylate group, and, optionally, d) at least one chain-extending segment having no (meth)acrylate groups or no more than one (meth)acrylate group, and wherein at least one multi(meth)acrylate-functionalized segment is located at a position along the polyurethane backbone of the multi(meth)acrylate-functionalized oligomer and at least one (meth)acrylate functional group is present at one or more terminal positions of the multi(meth)acrylate-functionalized oligomer.

Aspect 2: The multi(meth)acrylate-functionalized oligomer of Aspect 1, comprising at least one chain-extending segment selected from the group consisting of nonpolymeric aliphatic segments, polyether-containing segments, polyester-containing segments, polydiene-containing segments, polycarbonate-containing segments and polyorganosiloxane-containing segments.

Aspect 3: The multi(meth)acrylate-functionalized oligomer of Aspect 1 or Aspect 2, wherein the urethane-containing segments correspond to Formula (I):

[—O—C(═O)—NH—R$^1$—NH—C(═O)—O—] (I)

wherein R$^1$ is a divalent hydrocarbon moiety.

Aspect 4: The multi(meth)acrylate-functionalized oligomer of any one of Aspects 1 to 3, wherein the urethane-containing segment comprises a residue of a diisocyanate selected from the group consisting of tolylene diisocyanate, 4,4-diphenylmethane diisocyanate, xylylene diisocyanate, tetramethylxylylene diisocyanate, xylene diisocyanate, hexamethylene diisocyanate, lysine diisocyanate, 4,4'-methylenebis(cyclohexyl isocyanate), methylcyclohexane-2,4-diisocyanate, methylcyclohexane-2,6-diisocyanate, 1,3-(isocyanate methyl)cyclohexane, isophorone diisocyanate, trimethylhexamethylene diisocyanate, dimer acid diisocyanate, dianisidine diisocyanate, phenyl diisocyanate, halogenated phenyl diisocyanate, methylene diisocyanate, ethylene diisocyanate, butylene diisocyanate, propylene diisocyanate, octadecylene diisocyanate, 1,5-naphthalene diisocyanate, polymethylene polyphenylene diisocyanate, tolylene diisocyanate polymer, diphenylmethane diisocyanate polymer, hexamethylene diisocyanate polymer, 3-phenyl-2-ethylene diisocyanate, cumene-2,4-diisocyanate, 4-methoxy-1,3-phenylene diisocyanate, 4-ethoxy-1,3-phenylene diisocyanate, 2,4'-diisocyanate diphenyl ether, 5,6-dimethyl-1,3-phenylene diisocyanate, 4,4'-diisocyanate diphenyl ether, benzidine diisocyanate, 9,10-anthracene diisocyanate, 4,4'-diisocyanate benzyl, 3,3'-dimethyl-4,4'-diisocyanate diphenylmethane, 2,6'-dimethyl-4,4'-diisocyanate diphenyl, 3,3'-dimethoxy-4,4'-diisocyanate diphenyl, 1,4-anthracene diisocyanate, phenylene diisocyanate, 1,4-tetramethylene diisocyanate, 1,6-hexamethylene diisocyanate, 1,10-decamethylene diisocyanate, 1,3-cyclohexylene diisocyanate, 4,4'-methylene-bis(cyclohexyl isocyanate), and combinations thereof.

Aspect 5: The multi(meth)acrylate-functionalized oligomer of any of Aspects 1 to 4, wherein the oligomer comprises at least one multi(meth)acrylate-functionalized segment corresponding to Formula (IIa):

[—CHR$^2$—R$^3$—CHR$^4$—] (IIa)

wherein R$^2$ and R$^4$ are the same or different and correspond to —CH$_2$—O—C(═O)—CR$^5$═CH$_2$, wherein R$^5$ is H or CH$_3$, and R$^3$ is a divalent organo moiety.

Aspect 6: The multi(meth)acrylate-functionalized oligomer of Aspect 5, wherein R$^3$ is —R$^{3'}$— or —CH$_2$—O—R$^{3'}$—O—CH$_2$— and R$^{3'}$ is a divalent hydrocarbon moiety.

Aspect 7: The multi(meth)acrylate-functionalized oligomer of Aspects 1 to 6, wherein the oligomer comprises at least one multi(meth)acrylate-functionalized segment corresponding to Formula (IIb):

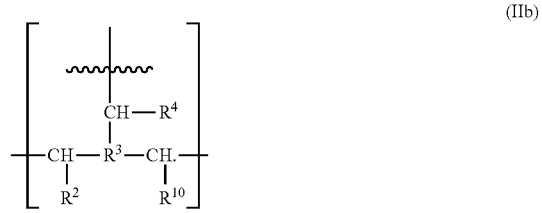

(IIb)

wherein R$^2$ and R$^4$ and R$^{10}$ are the same or different and correspond to —CH$_2$—O—C(═O)—CR$^5$═CH$_2$, wherein R$^5$ is H or CH$_3$, R$^3$ is a trivalent organo moiety and the wavy line represents a point of attachment to another segment of the oligomer, in particular to a urethane-containing segment.

Aspect 8: The multi(meth)acrylate-functionalized oligomer of Aspect 7, wherein R$^3$ is —R$^{3'}$— or

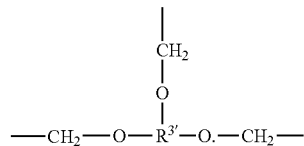

and R$^{3'}$ is a trivalent hydrocarbon moiety.

Aspect 9: The multi(meth)acrylate-functionalized oligomer of any of Aspects 1 to 8, wherein the oligomer comprises at least one chain-extending segment which is a polymer-containing segment.

Aspect 10: The multi(meth)acrylate-functionalized oligomer of Aspect 9, wherein the polymer-containing segment corresponds to Formula (III):

[—R$^6$—] (III)

wherein R$^6$ is a divalent polymeric moiety selected from the group consisting of polyether moieties, polyester moieties, polydiene moieties, polycarbonate moieties and polyorganosiloxane moieties.

Aspect 11: The multi(meth)acrylate-functionalized oligomer of Aspect 10, wherein the divalent polymeric moiety is a divalent polyether moiety selected from the group consisting of divalent polyoxyethylene moieties, divalent polyoxypropylene moieties, divalent polyoxyethylene/oxypropylene moieties, and divalent polyoxytetramethylene moieties.

Aspect 12: The multi(meth)acrylate-functionalized oligomer of any of Aspects 1 to 11, wherein the oligomer comprises at least one chain-extending segment which is a nonpolymeric aliphatic segment.

Aspect 13: The multi(meth)acrylate-functionalized oligomer of Aspect 12, wherein the nonpolymeric aliphatic segment corresponds to Formula (IIIa):

(IIIa)

wherein R$^{6a}$ is a divalent nonpolymeric aliphatic hydrocarbon moiety optionally additionally comprising one or more heteroatoms.

Aspect 14: The multi(meth)acrylate-functionalized oligomer of any of Aspects 1 to 13, wherein the at least one end-cap segment has a structure corresponding to Formula (IV):

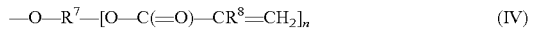

(IV)

wherein R$^7$ is an n+1 valent organo moiety, R$^8$ is H or CH$_3$, and n is an integer of 1 to 3.

Aspect 15: The multi(meth)acrylate-functionalized oligomer of Aspect 14, wherein n=1 and R$^7$ is —CH$_2$—CH$_2$— or —(CH$_2$)$_5$—C(=O)—[O—(CH$_2$)$_5$—C(=O)]$_x$—O—CH$_2$—CH$_2$— wherein x is an integer of from 0 to 9.

Aspect 16: The multi(meth)acrylate-functionalized oligomer of any of Aspects 1 to 15, wherein the oligomer has a number average molecular weight of from 3000 to 20,000 g/mol.

Aspect 17: The multi(meth)acrylate-functionalized oligomer of any of Aspects 1 to 16, wherein chain-extending segments and multi(meth)acrylate-functionalized segments are present in a molar ratio of 0:1 to 10:1.

Aspect 18: The multi(meth)acrylate-functionalized oligomer of any of Aspects 1 to 17, wherein urethane-containing segments are positioned between and link together multi(meth)acrylate-functionalized segments.

Aspect 19: The multi(meth)acrylate-functionalized oligomer of any of Aspects 1 to 18, wherein one or more chain-extending segments are present and urethane-containing segments are positioned between and link together multi(meth)acrylate-functionalized segments and chain-extending segments.

Aspect 20: The multi(meth)acrylate-functionalized oligomer of any of Aspects 1 to 19, wherein urethane-containing segments are positioned between and link together end-cap segments and multi(meth)acrylate-functionalized segments and/or, if one or more chain-extending segments are present, end-cap segments and chain-extending segments.

Aspect 21: The multi(meth)acrylate-functionalized oligomer of any of Aspects 1 to 20, wherein one or more chain-extending segments are present and the chain-extending segments and multi(meth)acrylate-functionalized segments are randomly disposed along the polyurethane backbone and linked together by urethane-containing segments.

Aspect 22: The multi(meth)acrylate-functionalized oligomer of any of Aspects 1 to 21, wherein the oligomer is comprised of one or more units of Formula (A2):

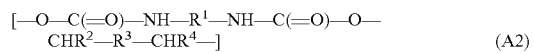

(A2)

wherein R$^1$ is a divalent hydrocarbon moiety, R$^2$ and R$^4$ are the same or different and correspond to —CH$_2$—O—C(=O)—CR$^5$=CH$_2$, wherein R$^5$ is H or CH$_3$ and R$^3$ is a divalent organo moiety.

Aspect 23: The multi(meth)acrylate-functionalized oligomer of Aspect 22, wherein the oligomer is additionally comprised of one or more units of Formula (B):

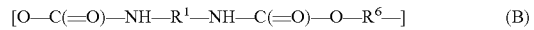

(B)

wherein R$^1$ is a divalent hydrocarbon moiety and R$^6$ is a divalent polymeric moiety selected from the group consisting of divalent polyether moieties, divalent polyester moieties, divalent polydiene moieties, divalent polycarbonate moieties and divalent polyorganosiloxane moieties.

Aspect 24: The multi(meth)acrylate-functionalized oligomer of Aspect 22 or 23, wherein the oligomer is additionally comprised of one or more units of Formula (B'):

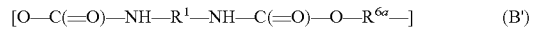

(B')

wherein R$^1$ is a divalent hydrocarbon moiety and R$^{6a}$ is a divalent nonpolymeric aliphatic moiety optionally additionally comprising one or more heteroatoms.

Aspect 25: The multi(meth)acrylate-functionalized oligomer of Aspects 1 to 24, wherein the oligomer is comprised of one or more units of Formula (A3):

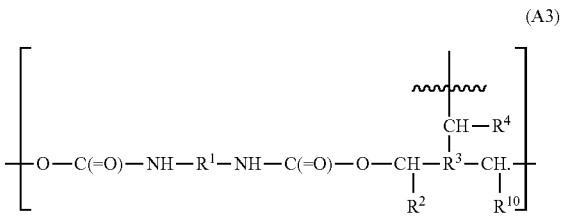

(A3)

wherein R$^1$ is a divalent hydrocarbon moiety; R$^2$, R$^4$ and R$^{10}$ are the same or different and correspond to —CH$_2$—O—C(=O)—CR$^5$=CH$_2$, wherein R$^5$ is H or CH$_3$; R$^3$ is a trivalent organo moiety; and the wavy line represents a point of attachment to another segment of the oligomer, in particular to a urethane-containing segment.

Aspect 26: The multi(meth)acrylate-functionalized oligomer of Aspect 25, wherein the oligomer is additionally comprised of one or more units of Formula (B):

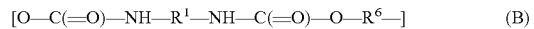

(B)

wherein R$^1$ is a divalent hydrocarbon moiety and R$^6$ is a divalent polymeric moiety selected from the group consisting of divalent polyether moieties, divalent polyester moieties, divalent polydiene moieties, divalent polycarbonate moieties and divalent polyorganosiloxane moieties.

Aspect 27: The multi(meth)acrylate-functionalized oligomer of any of Aspects 1 to 6 and 9 to 24, wherein:
the urethane-containing segments correspond to Formula (I):

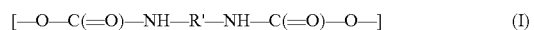

(I)

wherein R$^1$ is a divalent hydrocarbon moiety;

the at least one multi(meth)acrylate-functionalized segment corresponds to Formula (IIa):

$$[-CHR^2-R^3-CHR^4-] \quad (IIa)$$

wherein $R^2$ and $R^4$ are the same or different and correspond to $-CH_2-O-C(=O)-CR^5=CH_2$, wherein $R^5$ is H or $CH_3$, and $R^3$ is a divalent organo moiety; and any chain-extending segment, if present, corresponds to at least one of Formula (III) or Formula (IIIa):

$$[-R^6-] \quad (III)$$

wherein $R^6$ is a divalent polymeric moiety selected from the group consisting of divalent polyether moieties, divalent polyester moieties, divalent polydiene moieties, divalent polycarbonate moieties and divalent polyorganosiloxane moieties;

$$[-R^{6a}-] \quad (IIIa)$$

wherein $R^{6a}$ is a divalent nonpolymeric aliphatic moiety optionally additionally comprising one or more heteroatoms.

Aspect 28: A multi(meth)acrylate-functionalized oligomer having a polyurethane backbone, a plurality of (meth)acrylate functional groups pendant to the polyurethane backbone and one or more terminal (meth)acrylate functional groups, wherein the oligomer is a reaction product of reactants comprising a) at least one diisocyanate, b) at least one diol compound comprised of at least two (meth)acrylate functional groups or at least one triol compound comprised of at least three (meth)acrylate functional groups or a mixture thereof, c) at least one end-capping compound comprised of a single isocyanate-reactive hydroxyl group and at least one (meth)acrylate functional group, and, optionally, d) at least one chain-extending polyol comprising at least two hydroxyl groups and zero or one (meth)acrylate functional group(s).

Aspect 29: The multi(meth)acrylate-functionalized oligomer of Aspect 28, wherein b) comprises at least one diol compound and the diol compound is a reaction product of reactants comprised of an acid-functionalized (meth)acrylate and a diepoxide.

Aspect 30: The multi(meth)acrylate-functionalized oligomer of Aspect 28 or 29, wherein b) comprises at least one triol compound and the triol compound is a reaction product of reactants comprised of an acid-functionalized (meth)acrylate and a triepoxide.

Aspect 31: The multi(meth)acrylate-functionalized oligomer of Aspect 29 or 30, wherein the acid-functionalized (meth)acrylate has a structure corresponding to Formula (V):

$$H_2C=C(R)C(=O)O[CH_2CH_2C(=O)O]_nH \quad (V)$$

wherein R is H or $CH_3$ and n is an integer of 0 to 5.

Aspect 32: The multi(meth)acrylate-functionalized oligomer of Aspect 29, wherein the diepoxide is selected from the group consisting of diene diepoxides and diglycidyl ethers.

Aspect 33: The multi(meth)acrylate-functionalized oligomer of any of Aspects 28, 29, 31, or 32, wherein the diol compound is 1,4-bis(3-acryloyloxy-2-hydroxypropoxy)butane.

Aspect 34: The multi(meth)acrylate-functionalized oligomer of any of Aspects 28 to 33, wherein the end-capping compound is selected from the group consisting of (meth)acrylates of polyols in which all but one hydroxyl group has been (meth)acrylated.

Aspect 35: The multi(meth)acrylate-functionalized oligomer of any of Aspects 28 to 34, wherein the end-capping compound is selected from the group consisting of hydroxyalkyl (meth)acrylates.

Aspect 36: The multi(meth)acrylate-functionalized oligomer of any of Aspects 28 to 35, wherein the reactants comprise at least one chain-extending polyol selected from the group consisting of nonpolymeric aliphatic diols having up to one (meth)acrylate functional group per molecule, polyether polyols, polyester polyols, polydiene polyols, polycarbonate polyols and polyorganosiloxane polyols.

Aspect 37: A method of making a multi(meth)acrylate-functionalized oligomer having a polyurethane backbone, a plurality of (meth)acrylate functional groups pendant to the polyurethane backbone and one or more terminal (meth)acrylate functional groups, wherein the method comprises reacting a) at least one diisocyanate, b) at least one diol compound comprised of at least two (meth)acrylate functional groups, c) at least one end-capping compound comprised of a single isocyanate-reactive hydroxyl group and at least one (meth)acrylate functional group, and, optionally, d) at least one chain-extending polyol comprising at least two hydroxyl groups and zero or one (meth)acrylate functional group(s).

Aspect 38: A curable composition comprised of at least one multi(meth)acrylate-functionalized oligomer in accordance with any of Aspects 1 to 36 and at least one of a) a photoinitiator or b) a curable compound other than a multi(meth)acrylate-functionalized oligomer in accordance with any of Aspects 1 to 36.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the methods and compositions described herein. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Examples 1-3 demonstrate the preparation of acrylate-functional urethane oligomers having acrylate functionality positioned pendant to the oligomeric chain of the oligomer, but not on the terminal positions of the oligomeric chain. Such acrylate-functional urethane oligomers may be used as intermediates in the preparation of multi(meth)acrylate-functionalized oligomers in accordance with the present invention by reacting the end groups of such oligomers so as to end-cap the oligomer with (meth)acrylate functional groups, as illustrated in Example 4.

Example 1

Polypropylene glycol with a number average molecular weight of approximately 2000 g/mol (Carpenter, Carpol®

PGP2000-60 polyol) (724.0 g), 1,4-bis(3-acryloyloxy-2-hydroxypropoxy)butane (Sartomer, CN132) (152.7 g), isophorone diisocyanate (Covestro, Desmodur® I) (121.0 g) and butylated hydroxytoluene (Aldrich) (2.0 g) were added to a reactor and stirred at room temperature for five minutes. Air sparge was applied. Dibutyltin dilaurate (Aldrich) (0.3 g) was then added to the mixture. The reaction was exothermic. When the pot temperature stopped rising, the mixture was carefully heated to 80° C. with agitation and air sparge and then held at 80° C. for four hours or until residual NCO was <0.06%. Yield was 1000 grams. Example 4 describes how this oligomer may be converted into a multi (meth)acrylate-functionalized oligomer in accordance with the present invention.

Example 2

Poly(neopentyl glycol adipate) polyol with a number average molecular weight of approximately 2000 g/mol (Coim, Diexter-G 5500-56) (739.9 g), 1,4-bis(3-acryloyloxy-2-hydroxypropoxy)butane (Sartomer, CN132) (133.1 g), isophorone diisocyanate (Covestro, Desmodur I) (123.4 g) and Irganox® 1035 (BASF) (3.0 g) were added to a reactor and heated to 60° C. with agitation. Air sparge was applied. Bismuth neodecanoate (Reaxis, C716) (0.6 g) was then added to the mixture when the pot temperature reached 60° C. The reaction was exothermic. While the pot temperature stopped rising, the mixture was carefully heated to 105° C. with agitation and air sparge then held at 105° C. for two hours or until residual NCO was <0.06%. Yield was 1000 grams.

Example 3

The triacrylate of trimethylolpropane triglycidyl ether (Sartomer, CN133) (866.1 g), bismuth(3+) neodecanoate (Reaxis, C716) (0.6 g) and butylated hydroxytoluene (Aldrich) (2.0 g) were added to a reactor. The mixture was carefully heated to 65° C. with agitation and air sparge. Isophorone diisocyanate (Covestro, Desmodur® I) (131.3 g) was metered into the reactor over two hours. The reaction was exothermic. The pot temperature was allowed to reach 95° C. then held at 95° C. for one hour or until residual NCO was <0.06%. Yield was 1000 grams.

Examples 4-9 demonstrate the synthesis of acrylate-functional urethane oligomers in accordance with the present invention, wherein the acrylate functionality is positioned both pendant to and at the ends of the oligomeric chain.

Example 4

The final product from Example 1 (888.7 g), 2-hydroxyethyl acrylate (Nippon Shokubai) (38.2 g) and isophorone diisocyanate (Covestro, Desmodur® I) (73.1 g) were mixed in a reactor at room temperature. Air sparge was applied. The reaction was exothermic. When the pot temperature stopped rising, the mixture was carefully heated to 95° C. with agitation and air sparge then held at 95° C. for four hours or until residual NCO was <0.06%. Yield was 1000 grams.

Example 5

2-Hydroxyethyl acrylate (Nippon Sukubai) (38.2 g), 1,4-bis(3-acryloyloxy-2-hydroxypropoxy)butane (Sartomer, CN132) (118.0 g), polypropylene glycol with a number average molecular weight of approximately 2000 g/mol (Carpenter, Carpol® PGP2000-60 polyol) (657.3 g), isophorone diisocyanate (Covestro, Desmodur® I) (182.6 g) and butylated hydroxytoluene (Aldrich) (3 g) were added to a reactor and stirred at room temperature for five minutes. Air sparge was applied. Dibutyltin dilaurate (Aldrich) (0.9 g) was then added to the mixture. The reaction was exothermic. When the pot temperature stopped rising, the mixture was carefully heated to 95° C. with agitation and air sparge then held at 95° C. for four hours or until residual NCO was <0.06%. Yield was 1000 grams.

Example 6

Caprolactone-modified 2-hydroxyethyl acrylate (Sartomer, SR495B) (493.6 g), 1,4-bis(3-acryloyoxy-2-hydroxypropoxy)butane (Sartomer, CN132) (257.5 g), hexamethylene diisocyanate (Covestro, Desmodur® H) (245.2 g) and butylated hydroxytoluene (Aldrich) (3.0 g) were added to a reactor and stirred at room temperature for five minutes. Air sparge was applied. Dibutyltin dilaurate (Aldrich) (0.7 g) was then added to the mixture. The reaction was exothermic. When the pot temperature stopped rising, the mixture was carefully heated to 90° C. with agitation and air sparge then held at 90° C. for nine hours or until residual NCO was <0.06%. Yield was 1000 grams.

Example 7

Caprolactone-modified 2-hydroxyethyl acrylate (Sartomer, SR495B) (109.4 g), 1,4-bis(3-acryloyloxy-2-hydroxypropoxy)butane (Sartomer, CN132) (114.0 g), polypropylene glycol with a number average molecular weight of approximately 2000 g/mol (Carpenter, Carpol® PGP2000-60 polyol) (635.0 g), hexamethylene diisocyanate (Covestro, Desmodur® H) (137.9 g) and butylated hydroxytoluene (Aldrich) (3.0 g) were added to a reactor and stirred at room temperature for five minutes. Air sparge was applied. Dibutyltin dilaurate (Aldrich) (0.7 g) was then added to the mixture. The reaction was exothermic. When the pot temperature stopped rising, the mixture was carefully heated to 90° C. with agitation and air sparge then held at 90° C. for nine hours or until residual NCO was <0.06%. Yield was 1000 grams.

Example 8

2-Hydroxyethyl acrylate (Nippon Sukubai) (37.7 g), 1,4-bis(3-acryloyloxy-2-hydroxypropoxy)butane (Sartomer, CN132) (118.2 g), poly(neopentyl glycol adipate) polyol with a number average molecular weight of approximately 2000 g/mol (Coim, Diexter-G 5500-56) (659.0 g), isophorone diisocyanate (Covestro, Desmodur® I) (181.5 g) and Irganox® 1035 (BASF) (3.0 g) were added to a reactor and heated to 60° C. with agitation. Air sparge was applied. Bismuth neodecanoate (Reaxis, C716) (0.6 g) was then added to the mixture when the pot temperature reached 60° C. The reaction was exothermic. While the pot temperature stopped rising, the mixture was carefully heated to 105° C. with agitation and air sparge then held at 105° C. for two hours or until residual NCO was <0.06%. Yield was 1000 grams.

Example 9

Isophorone diisocyanate (Covestro, Desmodur® I) (177.2 g), Irganox® 1035 (BASF) (3.0 g) and dibutyltin dilaurate (Aldrich) (0.9 g) were added to a reactor and stirred at room temperature for five minutes. Air sparge was applied. 1,4-Bis(3-acryloyloxy-2-hydroxypropoxy)butane (Sartomer, CN132) (143.0 g) was metered into the mixture over half an hour. The reaction was exothermic. The pot temperature was allowed to reach 60° C. then held at 60° C. with agitation and air sparge for half an hour or until NCO reached the range of 10.1-10.4%. This mixture was transferred into a capped 16 oz brown bottle and labeled as A. Polycarbonate polyol with a number average molecular weight of approximately 500 g/mol (UBE, Eternacoll® UH-50) (406.5 g) was pre-melted in a 60° C. oven and added into another clean reactor, then heated to 60° C. with agitation. When the pot temperature reached 60° C., air sparge was applied and the previously made isocyanate terminated prepolymer A was added into the reactor by ten increments over one hour. The pot temperature was allowed to reach 90° C. then held at 90° C. with agitation and air sparge for half an hour or until NCO=0. The half-adduct of isophorone diisocyanate and 2-hydroxyethyl acrylate (Evonik, VESTANAT EP-DC 1241) (269.4 g) was then added into the mixture with agitation and air sparge over half an hour. The pot temperature was allowed to reach 105° C. then held at 105° C. with agitation and air sparge for two hours or until NCO was <0.06%. Yield was 1000 grams.

Table 1 lists the properties of certain of the oligomers described in the above Examples, as well as properties of UV-cured products obtained therefrom. CO-1, included for comparative purposes, is a low Tg conventional end-functional ("telechelic") acrylated urethane oligomer (i.e., an oligomer having end-group acrylate functionality, but no acrylate functionality pendant to the backbone of the oligomer). The molecular weight values reported in Table 1 were obtained using an Agilent 1260 GPC with a refractive index detector and using polystyrene standards for calibration.

TABLE 1

| Oligomer | CO-1 | Ex. 1 | Ex. 5 | Ex. 6 | Ex. 7 |
|---|---|---|---|---|---|
| Viscosity (cps @ 60° C.) | 3000 | 1917 | 13540 | 1507 | 14100 |
| Mn (by GPC) | 4693 | 5615 | 4839 | 1478 | 4260 |
| Mw (by GPC) | 10239 | 9647 | 13364 | 2851 | 16533 |
| Tg (° C.) (by DMA) | −43 | −36 | −31 | 49 | −33 |
| Tensile Stress (psi) | 64 ± 14 | 39 ± 16 | 591 ± 18 | 1295 ± 18 | 241 ± 26 |
| Elongation (%) | 70 ± 14 | 55 ± 20 | 80 ± 3 | 22 ± 1 | 38 ± 2 |
| Young's Modulus (psi) | 112 ± 9 | 78 ± 8 | 1054 ± 64 | 7834 ± 695 | 823 ± 12 |

Although the oligomer of Example 1 was similar in molecular weight to CO-1, its viscosity at 60° C. was significantly lower than that of CO-1. The oligomer of Example 5 had a molecular weight similar to that of CO-1 and the glass transition temperatures (Tgs) of these oligomers when cured were also similar. However, the Example 5 oligomer yielded a cured product having notably higher Young's modulus and tensile stress, as compared to the cured product obtained from the CO-1 oligomer. Without wishing to be bound by theory, it is believed that the significant enhancements in mechanical properties observed in the case of the Example 5 oligomer are attributable to the presence of both pendant and end-group acrylate functionality.

Example 10

Dicyclohexylmethane-4,4'-diisocyanate (Covestro, Desmodur® W) (319.2 g), butylated hydroxytoluene (Aldrich) (1.0 g), 1,4-bis(3-acryloyloxy-2-hydroxypropoxy)butane (Sartomer, CN132) (100.0 g), trimethylol propane triglycidyl ether triacrylate (Sartomer, CN133) (100.0 g) and caprolactone-modified 2-hydroxyethyl acrylate (Sartomer, SR495B) (100.0 g) were added to a reactor and stirred at room temperature for five minutes. Air sparge was applied. Dibutyltin dilaurate (Aldrich) (0.9 g) was then added to the mixture. The reaction was exothermic. When the pot temperature stopped rising, the mixture was held at 65 to 70° C. with agitation and air sparge for half an hour or until NCO reached the range of 10.6-11.2%. More caprolactone-modified 2-hydroxyethyl acrylate (Sartomer, SR495B) (378.9 g) was then metered into the mixture over one hour. The pot temperature was allowed to reach 90° C. then held at 90° C. with agitation and air sparge for four hours or until NCO was <0.06%. Yield was 1000 grams.

Example 11

Dicyclohexylmethane-4,4'-diisocyanate (Covestro, Desmodur® W) (323.7 g), butylated hydroxytoluene (Aldrich) (1.0 g), trimethylol propane triglycidyl ether triacrylate (Sartomer, CN133) (247.5 g) and caprolactone-modified 2-hydroxyethyl acrylate (Sartomer, SR495B) (426.9 g) were added to a reactor and stirred at room temperature for five minutes. Air sparge was applied. Dibutyltin dilaurate (Aldrich) (0.9 g) was then added to the mixture. The reaction was exothermic. When the pot temperature stopped rising, the mixture was carefully heated to 90° C. with agitation and air sparge then held at 90° C. for four hours or until residual NCO was <0.06%. Yield was 1000 grams.

Example 12

Isophorone diisocyanate (Covestro, Desmodur® I) (237.3 g), Irganox® 1035 (BASF) (2.0 g) and dibutyltin dilaurate (Aldrich) (0.6 g) were added to a reactor and stirred at room temperature for five minutes. Air sparge was applied. 2-Hydroxyethyl acrylate (Nippon Sukubai) (62.0 g) was metered into the mixture over half an hour. The reaction was exothermic. The pot temperature was allowed to reach 50° C. then held at 50° C. with agitation and air sparge for half an hour or until NCO reached the range of 22.0-23.0%. Polycarbonate polyol with a number average molecular weight of approximately 500 g/mol (UBE, Eternacoll® UH-50) (272.1 g) was pre-melted in a 60° C. oven and then metered into the mixture over one hour. The pot temperature was allowed to reach 70° C. then held at 70° C. with agitation and air sparge for one hour or until NCO reached the range of 4.0-4.5%. Acetone (VWR) (319.1) was added into the mixture to prevent viscosity being too high. Trimethylol propane triglycidyl ether triacrylate (Sartomer, CN133) (106.9 g) was added into the mixture. The pot temperature was held at 65° C. with agitation and air sparge for eight hours or until NCO was <0.06%. Yield was 1000 grams (680.9 grams dried resin).

The invention claimed is:

1. A curable composition comprising (i) at least one multi(meth)acrylate-functionalized oligomer having a polyurethane backbone, a plurality of (meth)acrylate functional groups pendant to the polyurethane backbone, and one or more terminal (meth)acrylate functional groups, wherein the oligomer is comprised of a) at least one multi(meth)acrylate-functionalized segment having at least two pendant (meth)acrylate groups, b) urethane-containing segments, c) at least one end-cap segment having at least one (meth)acrylate group, and, optionally, d) at least one chain-extending segment having no (meth)acrylate groups or no more than one (meth)acrylate group, and wherein at least one multi(meth)acrylate-functionalized segment is located at a position along the polyurethane backbone of the multi(meth)acrylate-functionalized oligomer and at least one (meth)acrylate functional group is present at one or more terminal positions of the multi(meth)acrylate-functionalized oligomer; and (ii) at least one of a) a photoinitiator or b) a curable compound, wherein the curable composition contains less than 10% non-reactive solvent based on the total weight of the curable composition, wherein the multi(meth)acrylate-functionalized oligomer has a number average molecular weight of from 500 to 20,000 g/mol, and wherein the oligomer comprises at least one multi(meth)acrylate-functionalized segment corresponding to one of Formula (IIa):

[—CHR$^2$—R$^3$—CHR$^4$—]   (IIa)

wherein R$^2$ and R$^4$ are the same or different and correspond to
—CH$_2$—O—C(=O)—CR$^5$=CH$_2$, wherein R$^5$ is H or CH$_3$, and R$^3$ is a divalent organo moiety;
or Formula (IIb):

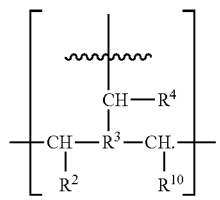
(IIb)

wherein R$^2$ and R$^4$ and R$^{10}$ are the same or different and correspond to CH$_2$—O—C(=O)—CR$^5$=CH$_2$, wherein R$^5$ is H or CH$_3$, R$^3$ is a trivalent organo moiety and the wavy line represents a point of attachment to another segment of the oligomer, in particular to a urethane-containing segment.

2. The curable composition of claim 1, comprising the at least one chain-extending segment and the at least one chain-extending segment is selected from the group consisting of nonpolymeric aliphatic segments, polyether-containing segments, polyester-containing segments, polydiene-containing segments, polycarbonate-containing segments and polyorganosiloxane-containing segments.

3. The curable composition of claim 1, wherein the urethane-containing segments correspond to Formula (I):

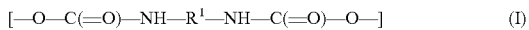
[—O—C(=O)—NH—R$^1$—NH—C(=O)—O—]   (I)

wherein R$^1$ is a divalent hydrocarbon moiety.

4. The curable composition of claim 1, wherein the urethane-containing segment comprises a residue of a diisocyanate selected from the group consisting of tolylene diisocyanate, 4,4-diphenylmethane diisocyanate, xylylene diisocyanate, tetramethylxylylene diisocyanate, xylene diisocyanate, hexamethylene diisocyanate, lysine diisocyanate, 4,4'-methylenebis(cyclohexyl isocyanate), methylcyclohexane-2,4-diisocyanate, methylcyclohexane-2,6-diisocyanate, 1,3-(isocyanate methyl)cyclohexane, isophorone diisocyanate, trimethylhexamethylene diisocyanate, dimer acid diisocyanate, dianisidine diisocyanate, phenyl diisocyanate, halogenated phenyl diisocyanate, methylene diisocyanate, ethylene diisocyanate, butylene diisocyanate, propylene diisocyanate, octadecylene diisocyanate, 1,5-naphthalene diisocyanate, polymethylene polyphenylene diisocyanate, tolylene diisocyanate polymer, diphenylmethane diisocyanate polymer, hexamethylene diisocyanate polymer, 3-phenyl-2-ethylene diisocyanate, cumene-2,4-diisocyanate, 4-methoxy-1,3-phenylene diisocyanate, 4-ethoxy-1,3-phenylene diisocyanate, 2,4'-diisocyanate diphenyl ether, 5,6-dimethyl-1,3-phenylene diisocyanate, 4,4'-diisocyanate diphenyl ether, benzidine diisocyanate, 9,10-anthracene diisocyanate, 4,4'-diisocyanate benzyl, 3,3'-dimethyl-4,4'-diisocyanate diphenylmethane, 2,6'-dimethyl-4,4'-diisocyanate diphenyl, 3,3'-dimethoxy-4,4'-diisocyanate diphenyl, 1,4-anthracene diisocyanate, phenylene diisocyanate, 1,4-tetramethylene diisocyanate, 1,6-hexamethylene diisocyanate, 1,10-decamethylene diisocyanate, 1,3-cyclohexylene diisocyanate, 4,4'-methylene-bis(cyclohexyl isocyanate), and combinations thereof.

5. The curable composition of claim 1, wherein the oligomer comprises the at least one multi(meth)acrylate-functionalized segment corresponding to Formula (IIa) and R$^3$ is —R$^{3'}$— or —CH$_2$—O—R$^{3'}$—O—CH$_2$— and R$^{3'}$ is a divalent hydrocarbon moiety.

6. The curable composition of claim 1, wherein the oligomer comprises the at least one multi(meth)acrylate-functionalized segment corresponding to Formula (IIb) and R$^3$ is —R$^{3'}$— or R$^3$ corresponds formula (IIb')

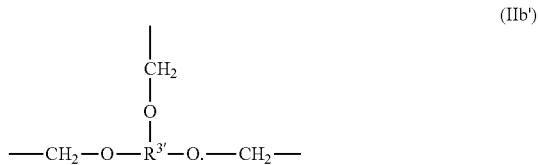
(IIb')

wherein R$^{3'}$ is a trivalent hydrocarbon moiety.

7. The curable composition of claim 1, wherein the oligomer comprises at least one chain-extending segment which is a polymer-containing segment and the polymer-containing segment corresponds to Formula (III):

[—R$^6$—]   (III)

wherein R$^6$ is a divalent polymeric moiety selected from the group consisting of polyether moieties, polyester moieties, polydiene moieties, polycarbonate moieties and polyorganosiloxane moieties.

8. The curable composition of claim 7, wherein the divalent polymeric moiety is a divalent polyether moiety selected from the group consisting of divalent polyoxyethylene moieties, divalent polyoxypropylene moieties, divalent polyoxyethylene/oxypropylene moieties, and divalent polyoxytetramethylene moieties.

9. The curable composition of claim 1, wherein the oligomer comprises at least one chain-extending segment which is a nonpolymeric aliphatic segment and the nonpolymeric aliphatic segment corresponds to Formula (IIIa):

[—R$^{6a}$—]   (IIIa)

wherein R$^{6a}$ is a divalent nonpolymeric aliphatic hydrocarbon moiety optionally additionally comprising one or more heteroatoms.

10. The curable composition of claim 1, wherein the oligomer comprises at least one end-cap segment having a structure corresponding to Formula (IV):

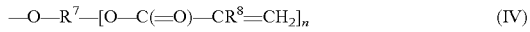
—O—R$^7$—[O—C(=O)—CR$^8$=CH$_2$]$_n$   (IV)

wherein R$^7$ is an n+1 valent organo moiety, R$^8$ is H or CH$_3$, and n is an integer of 1 to 3.

11. The curable composition of claim 10, wherein n=1 and $R^7$ is —$CH_2CH_2$— or —$(CH_2)_5C(=O)$ [O—$(CH_2)_5C(=O)]_xOCH_2CH_2$— wherein x is an integer of from 0 to 9.

12. The curable composition of claim 1, wherein the multi(meth)acrylate-functionalized oligomer comprises at least one chain-extending segment which is a polymer-containing segment and the multi(meth)acrylate-functionalized oligomer has a number average molecular weight of from 3000 to 20,000 g/mol.

13. The curable composition of claim 1, wherein the oligomer is comprised of one or more units of Formula (A2):

[—O—C(=O)—NH—$R^1$—NH—C(=O)—O—$CHR^2$—$R^3$—$CHR^4$—]  (A2)

wherein $R^1$ is a divalent hydrocarbon moiety, $R^2$ and $R^4$ are the same or different and correspond to —$CH_2$—O—C(=O)—$CR^5$=$CH_2$, wherein $R^5$ is H or $CH_3$ and $R^3$ is a divalent organo moiety.

14. The curable composition of claim 13, wherein the oligomer is additionally comprised of one or more units of Formula (B):

[O—C(=O)—NH—$R^1$—NH—C(=O)—O—$R^6$—]  (B)

wherein $R^1$ is a divalent hydrocarbon moiety and $R^6$ is a divalent polymeric moiety selected from the group consisting of divalent polyether moieties, divalent polyester moieties, divalent polydiene moieties, divalent polycarbonate moieties and divalent polyorganosiloxane moieties.

15. The curable composition of claim 14, wherein the oligomer is additionally comprised of one or more units of Formula (B'):

[O—C(=O)—NH—$R^1$—NH—C(=O)—O—$R^{6a}$—]  (B')

wherein $R^1$ is a divalent hydrocarbon moiety and $R^{6a}$ is a divalent nonpolymeric aliphatic moiety optionally additionally comprising one or more heteroatoms.

16. The curable composition of claim 1, wherein the oligomer is comprised of one or more units of Formula (A3):

[—O—C(=O)—NH—$R^1$—NH—C(=O)—O—$CHR^2$—$R^3$(—$CHR^4$—)—$CHR^{10}$]  (A3)

wherein $R^1$ is a divalent hydrocarbon moiety, $R^2$ and $R^4$ and $R^{10}$ are the same or different and correspond to —$CH_2$—O—C(=O)—$CR^5$=$CH_2$, wherein $R^5$ is H or $CH_3$ and $R^3$ is a trivalent organo moiety.

17. The curable composition of claim 1, wherein:
the urethane-containing segments correspond to Formula (I):

[—O—C(=O)—NH—$R^1$—NH—C(=O)—O—]  (I)

wherein $R^1$ is a divalent hydrocarbon moiety;
the at least one multi(meth)acrylate-functionalized segment corresponds to Formula (II):

[—$CHR^2$—$R^3$—$CHR^4$—]  (IIa)

wherein $R^2$ and $R^4$ are the same or different and correspond to —$CH_2$—O—C(=O)—$CR^5$=$CH_2$,
wherein $R^5$ is H or $CH_3$, and $R^3$ is a divalent organo moiety; and
any chain-extending segment, if present, corresponds to at least one of Formula (III) or Formula (IIIa):

[—$R^6$—]  (III)

wherein $R^6$ is a divalent polymeric moiety selected from the group consisting of divalent polyether moieties, divalent polyester moieties, divalent polydiene moieties, divalent polycarbonate moieties and divalent polyorganosiloxane moieties;

[—$R^{6a}$—]  (IIIa)

wherein $R^{6a}$ is a divalent nonpolymeric aliphatic moiety optionally additionally comprising one or more heteroatoms.

18. A multi(meth)acrylate-functionalized oligomer having a polyurethane backbone, a plurality of (meth)acrylate functional groups pendant to the polyurethane backbone and one or more terminal (meth)acrylate functional groups, wherein the oligomer is a reaction product of reactants consisting of a) at least one diisocyanate or a higher functionality polyisocyanate, b) at least one diol compound comprised of a reaction product of reactants comprised of an acid-functionalized (meth)acrylate and a diepoxide or at least one triol compound comprised of a reaction product of reactants comprised of an acid-functionalized (meth)acrylate and a triepoxide, c) at least one end-capping compound comprised of a single isocyanate-reactive hydroxyl group and at least one (meth)acrylate functional group, and, optionally, d) at least one chain-extending polyol comprising at least two hydroxyl groups and zero or one (meth)acrylate functional groups, wherein the multi(meth)acrylate-functionalized oligomer has a number average molecular weight of from 500 to 20,000 g/mol.

19. The multi(meth)acrylate-functionalized oligomer of claim 18, wherein b) is the at least one diol compound and the acid-functionalized (meth)acrylate has a structure corresponding to Formula (V):

$H_2C$=C(R)C(=O)O[$CH_2CH_2C$(=O)O]$_n$H  (V)

wherein R is H or $CH_3$ and n is an integer of 0 to 5.

20. The multi(meth)acrylate-functionalized oligomer of claim 18, wherein b) is the at least one diol compound and the diol compound is 1,4-bis(3-acryloyloxy-2-hydroxypropoxy)butane.

21. The multi(meth)acrylate-functionalized oligomer of claim 18, wherein the end-capping compound is selected from the group consisting of (meth)acrylates of polyols in which all but one hydroxyl group has been (meth)acrylated.

22. The multi(meth)acrylate-functionalized oligomer of claim 18, wherein the end-capping compound is selected from the group consisting of hydroxyalkyl (meth)acrylates and caprolactone-modified hydroxyalkyl (meth)acrylates.

23. The curable composition of claim 1 comprising a) the photoinitiator and b) the curable compound.

24. A method for coating a substrate comprising the steps of applying the curable composition of claim 1 to the substrate and then curing the curable composition to provide a coated substrate.

25. A method of forming a 3D-printed article comprising the step of curing the curable composition of claim 1 to provide the 3D-printed article.

26. The curable composition of claim 1, wherein the multi(meth)acrylate-functionalized oligomer does not comprise one or more polymer-containing segments as the at least one chain-extending segment and has a number average molecular weight of from 500 g/mol to 5000 g/mol.

* * * * *